(12) United States Patent
Gautestad

(10) Patent No.: US 7,039,860 B1
(45) Date of Patent: May 2, 2006

(54) CREATING WEB PAGES CATEGORY LIST PRIOR TO THE LIST BEING SERVED TO A BROWSER

(75) Inventor: Arild O. Gautestad, Oslo (NO)

(73) Assignee: Netspinner Solutions AS, Oslo (NO)

( * ) Notice: Subject to any disclaimer, the term of this patent is extended or adjusted under 35 U.S.C. 154(b) by 0 days.

(21) Appl. No.: 09/409,898

(22) Filed: Oct. 1, 1999

(51) Int. Cl.
*G06F 7/00* (2006.01)

(52) U.S. Cl. .............................. 715/513; 715/500; 707/7

(58) Field of Classification Search .................. 715/500, 715/501.1, 513, 530; 707/7, 206
See application file for complete search history.

(56) References Cited

U.S. PATENT DOCUMENTS

| | | | | |
|---|---|---|---|---|
| 5,586,239 A | * | 12/1996 | Ueda ........................... | 715/513 |
| 5,706,509 A | * | 1/1998 | Man-Hak Tso ............. | 707/201 |
| 5,715,453 A | | 2/1998 | Stewart ....................... | 715/513 |
| 5,732,219 A | | 3/1998 | Blumer et al. .............. | 709/227 |
| 5,751,956 A | | 5/1998 | Kirsch ......................... | 709/203 |
| 5,761,683 A | | 6/1998 | Logan et al. ................ | 715/513 |
| 5,781,909 A | | 7/1998 | Logan et al. ................ | 715/513 |
| 5,793,966 A | | 8/1998 | Amstein et al. ............ | 709/203 |
| 5,801,702 A | * | 9/1998 | Dolan et al. ................ | 345/854 |
| 5,802,299 A | | 9/1998 | Logan et al. ................ | 709/218 |
| 5,802,530 A | | 9/1998 | Van Hoff .................... | 715/513 |
| 5,821,927 A | | 10/1998 | Gong ......................... | 345/822 |
| 5,835,712 A | | 11/1998 | DuFresne ................... | 709/203 |
| 5,855,013 A | | 12/1998 | Fisk .............................. | 707/3 |
| 5,855,015 A | | 12/1998 | Shoham ......................... | 707/5 |
| 5,862,325 A | | 1/1999 | Reed et al. ................. | 709/201 |
| 5,870,073 A | | 2/1999 | Kitou et al. ................. | 345/698 |
| 5,870,546 A | | 2/1999 | Kirsch ........................ | 709/205 |
| 5,870,552 A | | 2/1999 | Dozier et al. ............... | 709/219 |
| 5,878,421 A | | 3/1999 | Ferrel et al. ................. | 707/100 |
| 5,894,554 A | | 4/1999 | Lowery et al. ............. | 709/203 |

(Continued)

FOREIGN PATENT DOCUMENTS

| | | |
|---|---|---|
| EP | 0 908 833 | 4/1999 |
| WO | WO 99/33000 | 7/1999 |

OTHER PUBLICATIONS

John Breeden II, "New Search Engine Gets Jump on Business Data," Government Computer News, Sep. 2, 1999, p. E6.

*Primary Examiner*—Cesar B Paula
(74) *Attorney, Agent, or Firm*—Oblon, Spivak, McClelland, Maier & Neustadt, P.C.

(57) ABSTRACT

A method, system and computer program product for revising and publishing electronic documents. Two sets of electronic documents are generated and maintained on first and second computers. One set is stored on a first computer, for example, as static web pages at a company site. Another set is stored on a second computer at a non-local site such as, for example, an Internet server where the electronic documents are accessible to clients. Any modifications in the set of electronic documents at the local or company site are logged in a log file, and the set of electronic documents at the non-local site is modified accordingly so as to produce what appears to the client as a "dynamic" set of web pages. The revision and publication occurs through generation on the first computer of at least one category list document containing an item identifier, an item category, and descriptive data with hyperlinks to underlying detailed description electronic document files. The category list documents group items together which belong in a given category. The category list and the underlying detailed description electronic document files are saved in a format for accessing from a general viewer program such as, for example, a web browser. The detailed description data may also stored as text based records in, for example, a file of text records or a database of text records at the local site.

48 Claims, 19 Drawing Sheets

U.S. PATENT DOCUMENTS

| | | | | |
|---|---|---|---|---|
| 5,898,836 A | * | 4/1999 | Freivald et al. | 709/218 |
| 5,905,492 A | | 5/1999 | Straub et al. | 345/744 |
| 5,907,837 A | | 5/1999 | Ferrel et al. | 707/3 |
| 5,908,467 A | | 6/1999 | Barrett et al. | 709/218 |
| 5,920,864 A | | 7/1999 | Zhao | 707/10 |
| 5,943,670 A | * | 8/1999 | Prager | 707/5 |
| 5,948,058 A | * | 9/1999 | Kudoh et al. | 709/206 |
| 5,956,737 A | * | 9/1999 | King et al. | 715/517 |
| 5,958,008 A | * | 9/1999 | Pogrebisky et al. | 709/223 |
| 5,991,798 A | * | 11/1999 | Ozaki et al. | 709/217 |
| 6,003,027 A | * | 12/1999 | Prager | 707/5 |
| 6,067,541 A | * | 5/2000 | Raju et al. | 707/3 |
| 6,377,983 B1 | * | 4/2002 | Cohen et al. | 709/217 |
| 6,389,436 B1 | * | 5/2002 | Chakrabarti et al. | 715/513 |
| 6,519,597 B1 | * | 2/2003 | Cheng et al. | 707/10 |
| 6,681,370 B1 | * | 1/2004 | Gounares et al. | 715/513 |

* cited by examiner

List 3 (nos. <=5)  214

```
Set 3. html
    Summary data, link 1a
    Summary data, link 2b
    Summary data, link 3c
224 ─ Summary data, link 4d ─ 226
    Summary data, link 5e
```

*FIG. 4C*

List 4 (nos. >5)  216

```
Set 4. html
    Summary data, link 6f
    Summary data, link 7g
    Summary data, link 8h
    Summary data, link 9i
    Summary data, link 10j
```

*FIG. 4D*

Record Files

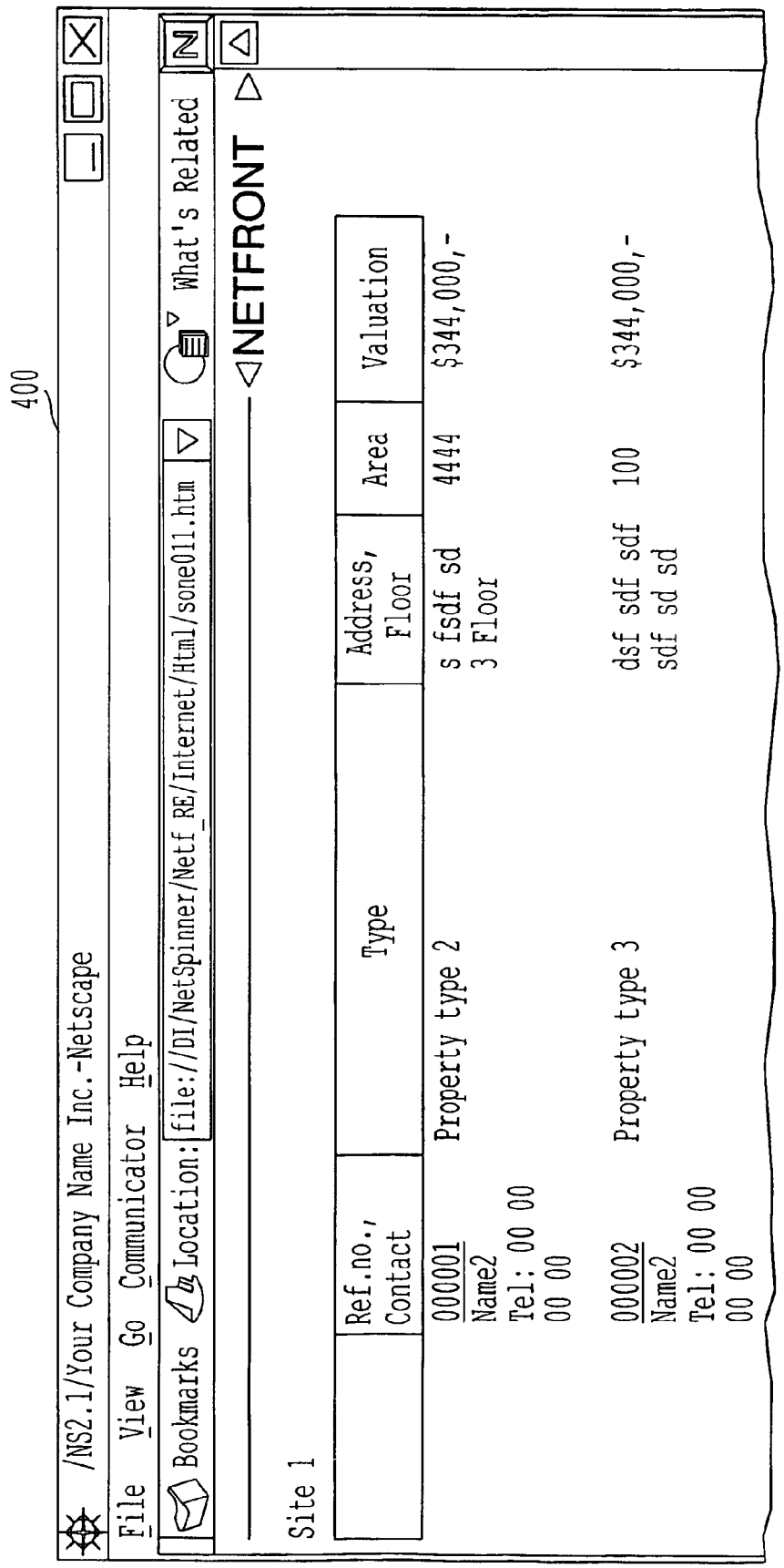
FIG. 8A(1)

| | Property type 2 | 333, Union street 2 Floor | 2500 | $230,000,- |
| --- | --- | --- | --- | --- |
| 0000003 Name2 Tel: 00 00 00 00 | | | | |
| 0000027 | Enebolig/Sommerbolig ved sjøen | Grundvikvn. 6 | 136 | $1 100 000,- |
| 0000028 | Enebolig | Oppilia 13 | 400 | $4.500.000,- |

FIG. 8A(2)

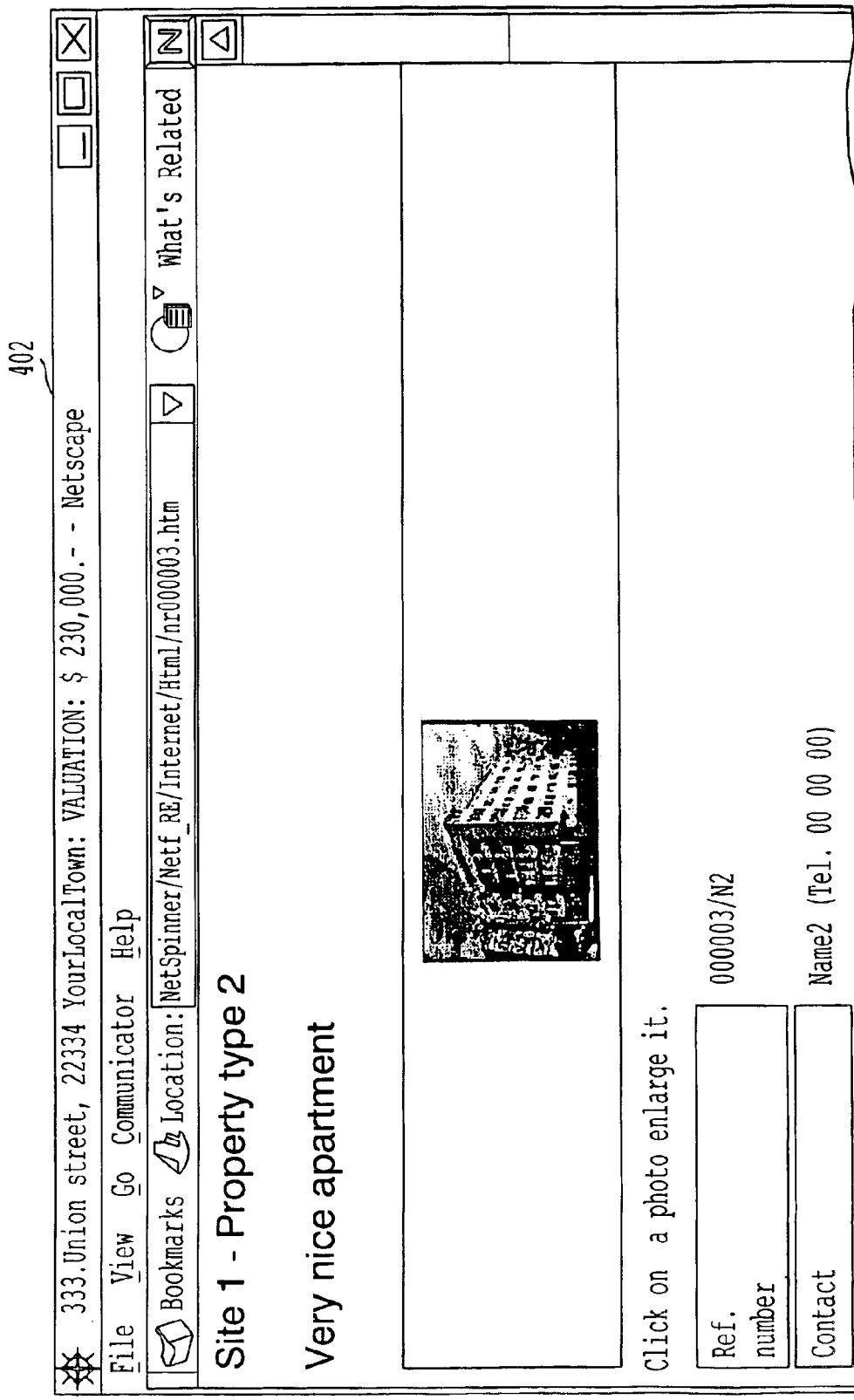
FIG. 8B(1)

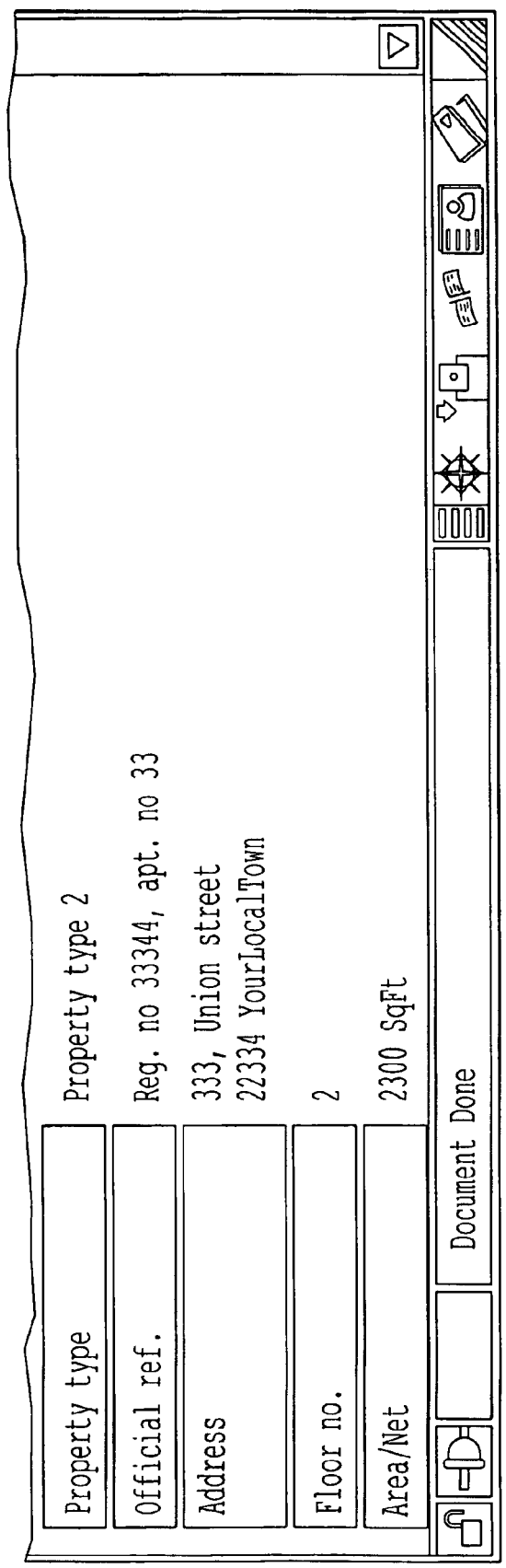
FIG. 8B(2)

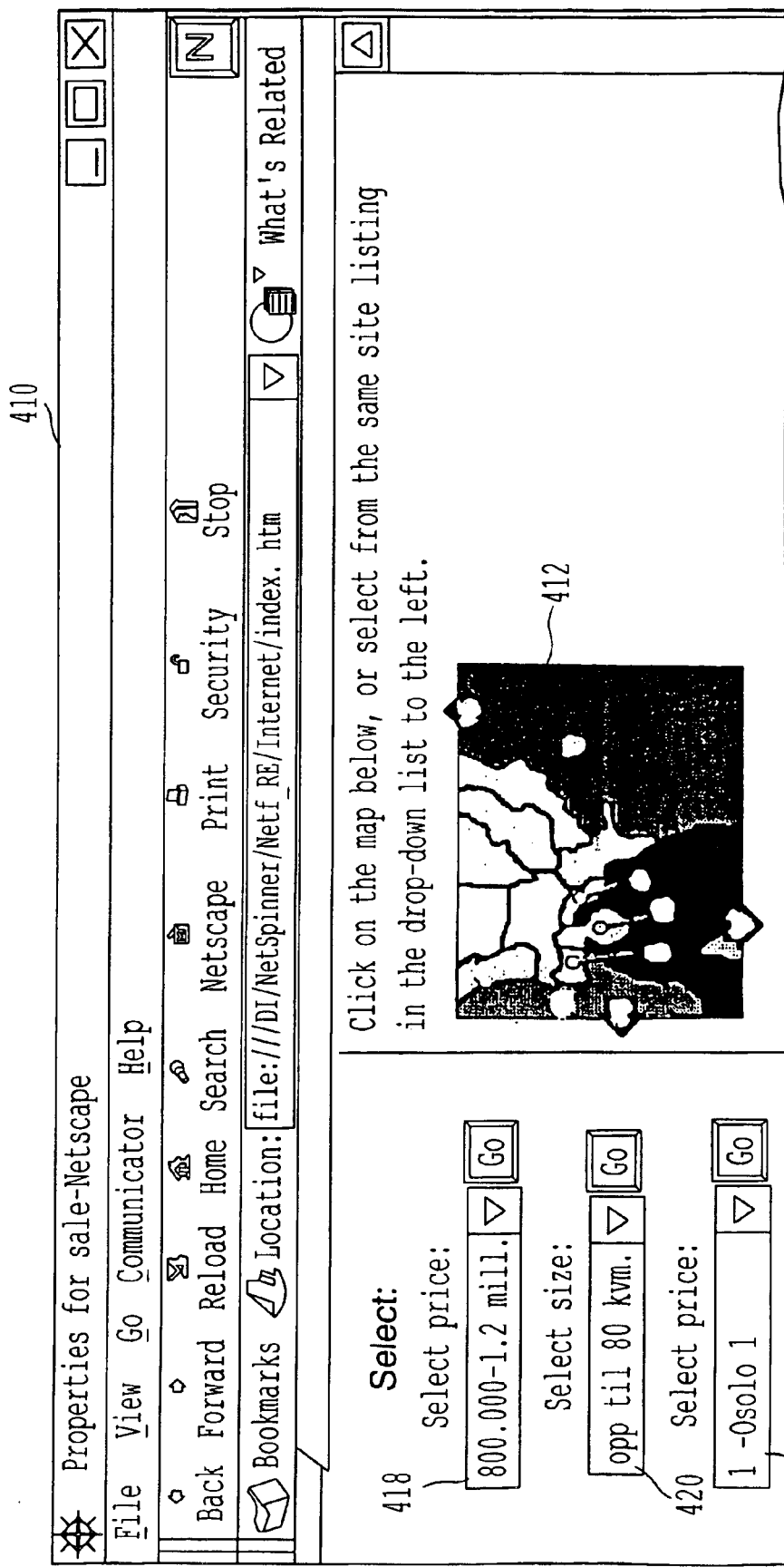
FIG. 8C(1)

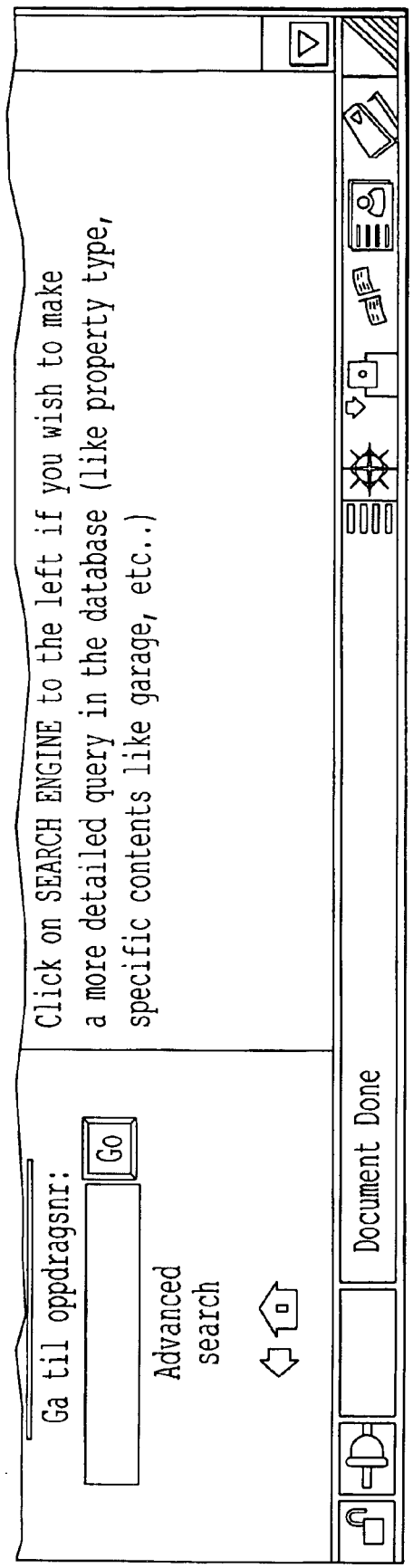
FIG. 8C(2)

CREATING WEB PAGES CATEGORY LIST PRIOR TO THE LIST BEING SERVED TO A BROWSER

BACKGROUND OF THE INVENTION

1. Field of the Invention

This invention relates generally to a method, system, and computer program product for production, revision, and hierarchical organization of electronic documents for local or global electronic network publication in the form of web browser- or word processor-accessible documents containing automatically updated lists with summary information of and hyperlinks to an underlying set of electronic documents with detailed information for each item in a given list.

2. Discussion of the Background

Software tools are now available to simplify the design and publication of static home pages in markup languages such as, for example, Hyper Text Markup Language ("HTML") or eXtensible Markup Language ("XML") for-matted text files in combination with graphics files for World Wide Web (web) publishing. Exemplary software tools include Microsoft FrontPage, NetObjects Fusion, and Hot-Metal Pro. The main advantage of static home pages is the ease of design of static home pages utilizing text files with embedded "tags," and the structural power inherent in linking documents using hyperlinks. The main disadvantage of static home page designs arises when the contents of the static pages requires frequent updates, particularly when such frequent updates involve adding and deleting a significant number of pages, as well as adding and deleting hyperlinks that refer to those updated pages from other parts of a given web page structure. For example, adding a new product description page or removing an existing page from a product catalog on the web normally involves revisions of additional pages. Those additional pages may include summary lists, or tables, of various products and product groups, which in turn may have hyperlinks to more detailed descriptions on the product description pages.

Microsoft FrontPage checks hyperlinks and creates reports of malfunctioning links between a summary list file and a detailed description file for each item in the summary list file. However, in response to adding or deleting the detailed description and graphical files, it does not automatically create, modify, or remove item summaries and their respective hyperlinks in the list.

As the burden of updating and organizing frequently revised static pages increases, some web site designers have chosen to use a database system with functions that generate interfaces between a database and web browsers in an HTML framework. For example, it is possible that a page may contain only page design tags and script commands, while the page's information contents may be retrieved dynamically from an Internet-connected server database's records and fields. U.S. Pat. No. 5,835,712 to DuFresne discloses such a technique. Active Server Pages running on the Microsoft Personal Web browser are another technique. FIGS. 1A and 1B illustrate a web document where data are retrieved from a database. In the web page design shown in FIG. 1A, a web page 100 includes a begin tag 102 and an end tag 108 and one line of code 106 for the web page publisher. The line of code 106 includes the database name and a Structured Query Language ("SQL") query. FIG. 1B shows a web page 110 including data returned from the database as it would appear to an end user. For setup and frequent maintenance of simple HTML-formatted pages as shown in FIG. 1A, many users have opted to use a client/server database web page solution (even for quite small data volumes and a relatively moderately sized updating frequency).

The dynamic retrieval occurs "on demand" and as defined from the page script commands. Thus, if information is changed in the database, this revision will automatically appear on the database-linked web page the next time a browser requests this page. Hereafter, this solution is referred to as a database-centric web page solution, and web pages which utilize this solution are referred to as database-centric web pages.

Dynamic web page publishing, including database-centric web pages and form-initiated database queries (i.e., search engine systems), rather than presenting this information in the form of pre-formatted or "static" web pages, requires that the information is retrieved on-the-fly from a database on the Internet or Intranet server on request. Queries to the database are processed by script programs which execute a search engine's algorithms to retrieve all the relevant data records from the database that satisfy a specific query from a user. The search engine then returns an HTML-formatted screen image of a list of "hits" to the user who has submitted the query. The user may then select one specific item on the list, and thereby engage the search engine once more to retrieve the full record information for this specific item and display it, for example, on a computer screen. Thus, each query generates a new search result from scratch. The database and the search engine reside, for example, either on a company's server or Intranet server, or on an Internet Service provider's Internet server.

A database-centric web page solution offers a large degree of functional flexibility and power to handle dynamic publication of large amounts of data on the web. In addition, a database-centric web page solution has the advantage of maintaining a given web page design, or profile. This is due to the fact that the profile is given a priority by the template of HTML or XML tags, combined with script function calls to retrieve data from the database. The main disadvantage is that a database system utilizing this solution is more resource-demanding than a database system in which the data is organized as simple static web documents such as, for example, text, sound, video, image and graphics files.

In spite of recent attempts to simplify setup and maintenance of database-centric dynamic web page publications based on templates for page layout and design, the switch from static pages is still an obstacle for most companies and institutions or for local offices and departments within such organizations. This switch is particularly unsuitable for smaller and medium sized companies, with limited information technology ("IT") knowledge and capacity to support a locally-administered database-driven web page system such as database-centric web pages. Consequently, without database-centric web page management tools, many existing static home pages have outdated contents due to a limited time available to perform necessary revisions on the static web pages. Many potential publication projects that could be maintained, for example, from a given office or local department using a database-centric web page solution are postponed due to lack of resources to switch to a database-centric solution and lack of the time resources necessary to individually update all the static web page sites and their hyperlinks.

One advantage of the present invention is that is simplifies the setup and maintenance of web publication for web pages which need frequent updating, and where the publication fits into a template of a hierarchy of overview category list document files with summary data from underlying detailed description electronic document files. This task has been time-consuming and impractical using conventional HTML editor tools. Thus, users have had to convert to database-centric frameworks.

SUMMARY OF THE INVENTION

Accordingly, one object of the invention is to provide a novel method, system, and computer program product for production, revision, and hierarchical organization of electronic documents on a computer for subsequent network publication of template-based and hierarchically organized information in the form of web browser- or word processor-accessible documents.

To achieve this object, the present invention stores in a first computer, for every given item, an electronic document file and a content data file containing at least (1) an identification field which includes an allocated identification code for the given item, (2) a category field which links the given item to at least one item category, and (3) a description field which includes descriptive data and hyperlinks to the respective electronic document files. The first computer can be a local computer or a local server. The electronic document files can be stored, for example, as simple text files or as files having links to accompanying static or animated graphical files.

This invention produces from the content data files a category list document file for each item that belongs to a given category, establishes in the first computer a hierarchal organization including the category list document files on one level and the respective first electronic document files for each category on an underlying level, and transfers said hierarchical organization of the category list and electronic document files in the first computer to a second computer, producing a counterpart category list document file and a counterpart electronic document file. The content data files use the identification field as part of their respective file names and can be stored as data fields with markup language tags or other forms for file contents structuring that makes it possible to retrieve a file's contents in a structured way when needed. One embodiment of the second computer is an Internet server. The category list and document files are saved in a format accessible from a viewer program such as an Internet browser or a word processing program. The hierarchical organization can be expanded vertically with more subcategories with specific sets of nested electronic files under each subcategory.

Modification information which logs modifications to the category list and electronic document files in the first computer is recorded as a log file. The modification information includes a list of identification codes for all files on the first computer which have been modified. Upon demand, all files that have been modified according to the modification information are transferred to the second computer resulting in the modification being kept in synchronization with the category list and electronic document files residing on the first computer. For example, synchronization is achieved by copying all new or modified files to the second computer, and by deleting all files in the second computer which correspond to files which have been deleted in the first computer. Upon direction, contents of fields, content data files, electronic document files, and category list files can be updated with the changes automatically being recorded in the log file for subsequent revision of the corresponding files on the second computer.

One advantage of this invention is to provide a novel method and system for electronic network publication of hierarchically organized information in order to make the process of frequent revision of static home pages more feasible for a larger range of Internet and Intranet publication tasks. These tasks include, for example, tabular and hierarchically organized news, presentations of staff in various departments, classification and presentation of frequently asked questions, product catalogs, course descriptions and curriculum, and other web publications with contents that change relatively frequently and with a hierarchical organization wherein one or more levels of lists contain hyperlinks to other lists or to detailed description on lower levels.

Accordingly, this invention provides a novel method and system for electronic network publication of hierarchically organized information affording straightforward maintenance of updated, complex static web publications well into the domain that traditionally has been considered an environment for database-centric systems (e.g., client/server systems).

In order to achieve these objects, a contents editor concentrates on filling in data into available text and graphical fields that contributes to a given template's content data level. The system then automatically updates the overlying level of tabular summary files (i.e., category list documents), based on which detailed descriptions on the content file level are defined to belong to which categories. Thus, a hierarchical structure of category list documents, each with a set of underlying item descriptions, is maintained and continuously updated.

A graphical user interface is provided which resembles a report view in a database program, wherein each report represents an actual collection of items belonging to a given group and wherein a given item's complete set of data fields can be easily retrieved in response to a user request, for example, a mouse-clock command. The graphical user interface also includes a page layout for a given detailed description data fields, resembling a "form view" in a database program, where new item descriptions may be added and where existing items may be revised or deleted. Alternative, complementary sets of list files are updated wherein each set categorizes items in accordance with alternative category definitions.

A third hierarchical level of an item organizing structure is organized wherein the third level comprises a super-set of underlying nested sets of item categories, so that the third level resembles different databases in a flat database structure, and each of the nested sets of item categories are accessible in response to a user request, for example, a mouse-click command.

Files are periodically copied, replaced and deleted on a remote server (automatically or on request) in accordance with a log file that includes a list of all item descriptions that have been modified, added, or deleted on a local machine since the last update event on the remote server, so that an identical copy of the local document file structure for the given hierarchical levels is maintained at an external server. Specially formatted text files containing summary data can be copied to a local or external network server to offer an open-ended export function of data to an external database. A local computer can be connected to an external database on the local personal computer ("PC") or local network server, in order to automatically import the contents of specific record files from the external database into defined data fields in the computer so that duplication of effort can be avoided.

One advantage of the present invention is that one or more static documents can be accessed from a general viewer program (e.g., an Internet browser or a word processing program) containing hyperlinks to the automatically updated category list documents for various item categories and resembling predefined database queries for a client/server database structure.

Another advantage of the present invention is that, by combining advantageous properties associated with static web page publications with specific advantageous properties from database-organizational and database-query principles, the system offers a practical, low-cost and less-information-technology-demanding alternative to dynamic web page publication with database-centric web pages.

Another advantage of the present invention is that a given web page publication task will be based on a given template for design, data field layout and organization. Thus, after the given template has been formed in the initial design phase, the contents editor can concentrate on filling in data into pre-defined fields using a user friendly and simple graphical interface.

Thus, the system provides a novel way to automate the organization and maintenance of frequently updated Intranet or Internet web page structures in a way that resembles the database-centric web page system including database queries and reports, but which involves only static web pages on an Intranet or Internet server.

A system, which has been named Web Mirroring Technology ("WMT"), automatically generates and updates hierarchically organized information contents, consisting of various list documents (e.g., tables of products belonging to a given product category) and their underlying linked documents (e.g., more detailed descriptions of a given items in a given table). WMT maintains two identical copies of the web site, one at the ISP's Internet server, and one at the company's own network. Thereby, one copy is a mirror image of the other. Due to its simplicity in terms of method and use, WMT solves many of the obstacles in connection with a search engine and database components in dynamic web page publishing.

Another advantage is that text files are easy to troubleshoot in comparison with binary, relational database files.

Another advantage of the present invention is that it does not rely on third-party software systems (e.g., a word processor, a database program, or other systems for entering, retrieval and/or formatting of data). This contributes to making web publication based on the present invention less vulnerable to errors, easier to install and adjust, easier to maintain due to simpler system structure, and easier to learn and to master (particularly for persons with little IT experience).

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 4A, 4B, 4C, and 4D are block diagrams showing the contents of various lists with each list grouped by a common category and having line items with summary data for and hyperlinks to a record file;

FIG. 4E is a block diagram showing the contents of the record file pointed to by the lists illustrated in FIGS. 4A, 4B, 4C, and 4D;

FIG. 8A is an exemplary display of an HTML-formatted category list file;

FIG. 8B is an exemplary display of a detailed description electronic document file;

FIG. 8C is an exemplary search page, offering hyperlinks to three parallel sets of categorical list files, a clickable map or an alternative drop-down box, and two drop-down boxes;

FIGS. 8D and 8E illustrate exemplary startup pages of a graphical user interface after the user has started the program or data revision process, similar to FIGS. 5A and 5B;

FIGS. 9A and 9B are exemplary shopping basket templates for web design including hyperlinks to a set of list files where Javascript is embedded in the static web design template to offer client-side shopping facilities such as, for example, calculations, for items in the basket;

DESCRIPTION OF THE PREFERRED EMBODIMENTS

Figure 1:
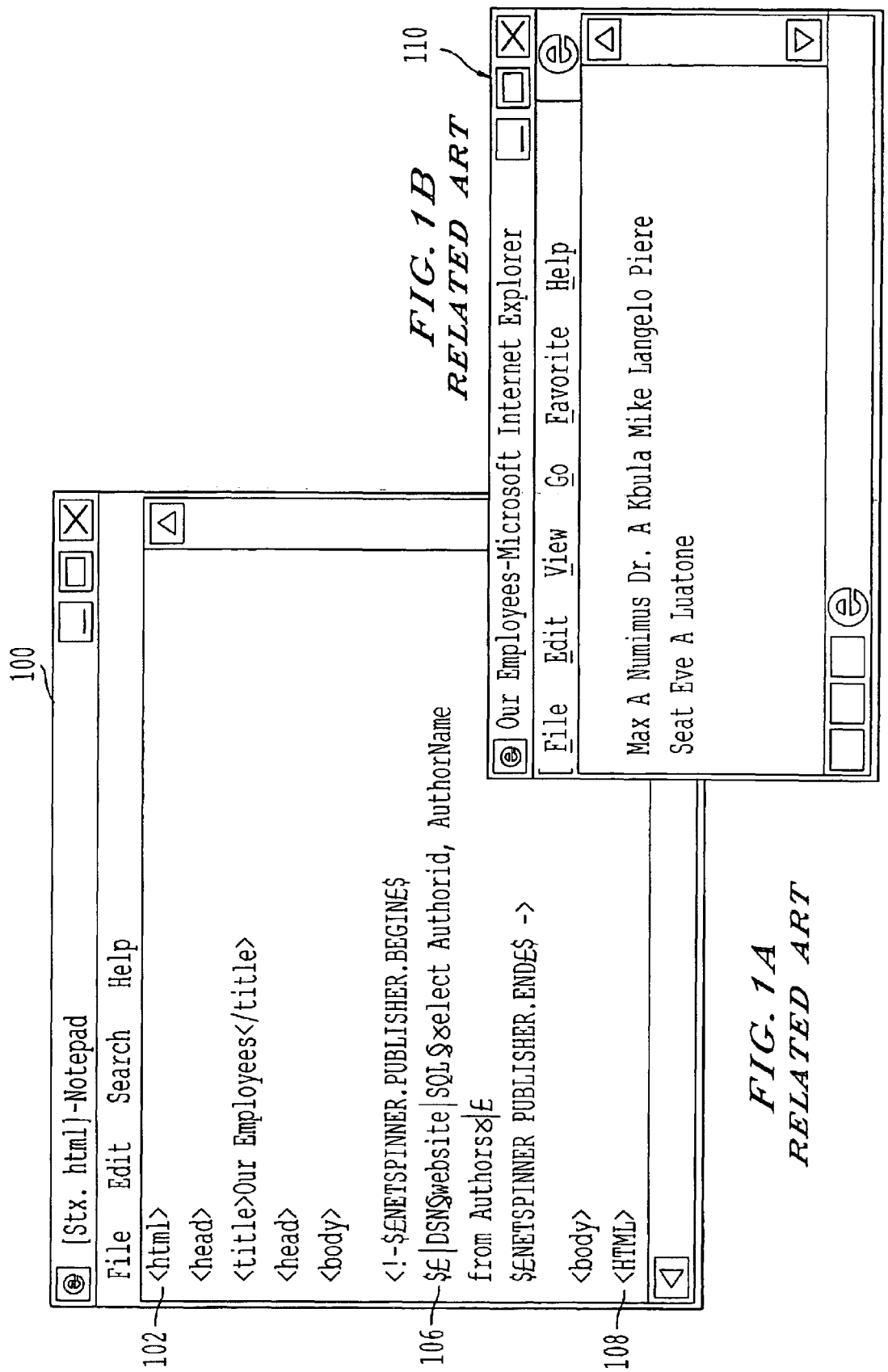
FIGS. 1A and 1B illustrate a web page design and a returned web page using a database system with functions that generate interfaces between a database and web browsers in an HTML framework.
Figure 2:
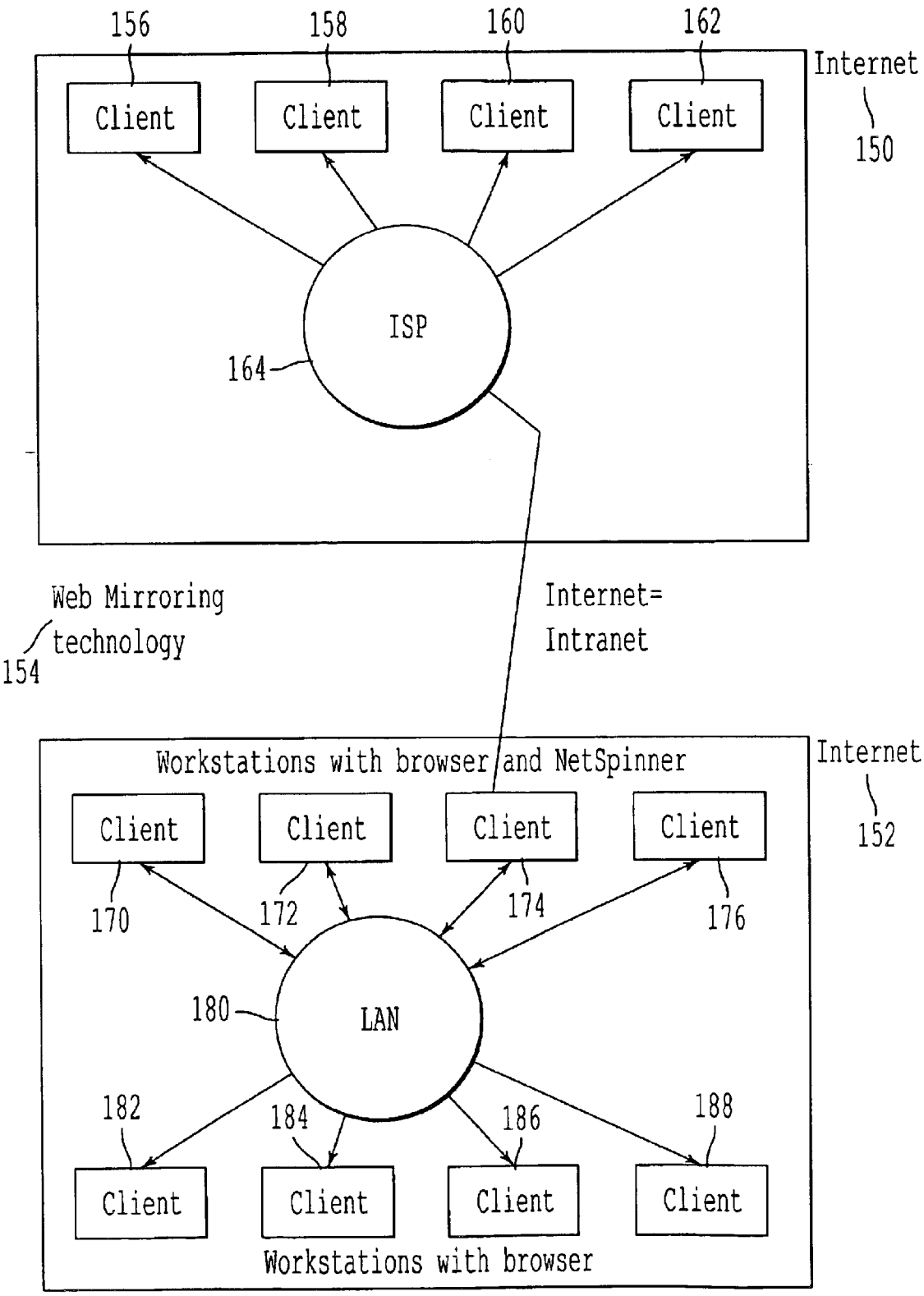
FIG. 2 is a block diagram showing the functional relationship of Web Mirroring Technology ("WMT") between an Internet Service Provider which publishes static company home pages and a local network computer which creates and maintains a local copy of the home pages.

Referring now to the drawings, wherein like reference numerals designate identical or corresponding parts throughout the several views, and more particularly to FIG. 2 thereof, there is shown a block diagram showing the functional relationship of Web Mirroring Technology ("WMT") 154 between an Internet Service Provider ("ISP") 164 which publishes web pages abroad on the Internet 150 and a local area network ("LAN") computer 180 which creates and maintains a local copy of the web pages on an Intranet 152. On the Internet 150, various home page visitors, for example, Clients 156, 158, 160 and 162, may use their web browser to display various category list documents which have been produced by software referenced herein as NetSpinner, which is exemplary software embodying at least some of the functions of the present invention, on the ISP's server 164, and may use hyperlinked elements inside these documents to retrieve individual detailed description (item) documents that are displayed in a given category list document. WMT 154, which will be described in detail below, offers an option for dynamic web page publishing, on the Internet 150, of the data contained in category list document files and detailed description electronic document files.

On the LAN 180, illustrated in FIG. 2 as belonging to the Intranet 152, clients (workstations) 182, 184, 186 and 188 may read NetSpinner-produced documents in a similar way as the clients on the Internet. Other clients 170, 172, 174 and 176 have NetSpinner installed in addition to their browser, so that these clients may revise (e.g., store, change, delete) as well as read an item's data. The NetSpinner software may be a specific executable file, or it may offer a similar set of features as a combination of server-side and/or client-side script algorithms for revising directly through a browser's graphical user interface. NetSpinner may also be an extension or "plug-in" to an existing web authoring tool, e.g., FrontPage.

The local network computer 180 and/or connected workstations 170, 172, 174, and 176 use a software tool (e.g., NetSpinner) to build and revise a hierarchical set of markup language (e.g., HyperText Markup Language ("HTML") or eXtensible Markup Language ("XML")) formatted category list files and detailed description electronic document files. These files, that contain identification, categorization, and descriptive data, are maintained as local web pages residing on the local computer 180 and represent the most up-to-date information that a company wishes to publish. Copies of these files are transferred on demand to the ISP server computer 164 wherein a set of publishable web pages is stored as a set of static web pages. Clients 156, 158, 160 and 162 logging into the website access these pages with no need to access the original files through the local computer 180. WMT 154 maintains identical copies of the local and publishable web pages. Theoretically, one copy of the browser-accessible set of web pages is a mirror image of the other, because changes that are made to the data in the local web pages are thereafter updated at the external ISP server. No extra database program or dynamic data-retrieving system is needed on the external server, nor on the local network server or PC.

In an alternate embodiment, only one copy of the files is maintained and edited on the ISP.

Instead of having the browser retrieve web page contents from a single database file or from a set of inter-connected database files as in a database-centric web page system, the WMT-based data presentation relies on successively generated static web pages (e.g., in the form of markup language files such as HTML-formatted or XML-formatted text files and accompanying graphical image files) in accordance with predefined but modifiable web page designs. Web page production is automatically performed by a PC- or workstation-installed computer program that will be described in detail below. The HTML, XML, or other markup language formatted text files are category list electronic document files and detailed description electronic document files.

With the present invention, one obtains the appearance of a database system, including four web-based database characteristics and three LAN-based database characteristics. On the web, those four database characteristics include:

1. pre-defined queries or report headings (i.e., a home page with links to category list documents that are maintained by the invention);

2. updated query results, or reports (i.e., a specific category list, containing references to all detailed descriptions of a predefined category);

3. links to underlying detailed description electronic document files from the list; and 4. category list and detailed description electronic document files formatted in accordance with a predefined template for field layout and Web design (i.e., style).

On a LAN, those three database characteristics include:

1. a graphical user interface including predefined text fields and fields for graphics, similar to a database's update editor (i.e., "form" view);

2. within the same graphical user interface, a tabular overview of some key fields (e.g., identification number, description data, etc.), similar to a database's report-view, where a user selects (e.g., using radio buttons) a report of records belonging to a specific category (e.g., Category 1, Category 2, etc.); and 3. a system that mimics a database system where a user may save, revise and delete detailed descriptions (i.e., description fields and associated electronic document files) but which, in its simplest form, comprises pure text files, by a combination of file name convention, directory structure, a file's internal structure, and a range of program-internal algorithms.

In contrast to a conventional database-centric publication, this invention pre-creates all markup language presentations (e.g., HTML presentations or XML presentations) on a local machine, based on the actual contents of a set of individual record files, in connection with a user selecting to "save" or "delete" a specific record, or selecting to "Update Internet." The continuously updated markup language pages include web presentation of records (i.e., detailed descriptions), as well as the various reports (i.e., pre-defined query results, or category list documents). Similar to a conventional database-system, the presentations are automatically maintained by the system. The user or the contents editor simply concentrates on filling in data for one record of detailed description information at a time and then saves it. Similar to a database system, the reports (e.g., the category list documents) themselves are not edited. They are maintained automatically in accordance with a predefined template for which a predetermined set of fields from each detailed description record is included in a given line of the report.

When the user selects the "Update Internet" command, added and modified local markup language documents (e.g., HTML-formatted or XML-formatted category list files and detailed description electronic document files) are automatically copied (and files corresponding to locally deleted records will be deleted also) on the external web server.

Thus, with the invention, the user obtains the benefit of the system simplicity from a "static web page publication," and a database system's strength from template-based presentation (style coherence), automatic organization, and power to handle frequent revisions.

Figure 3:
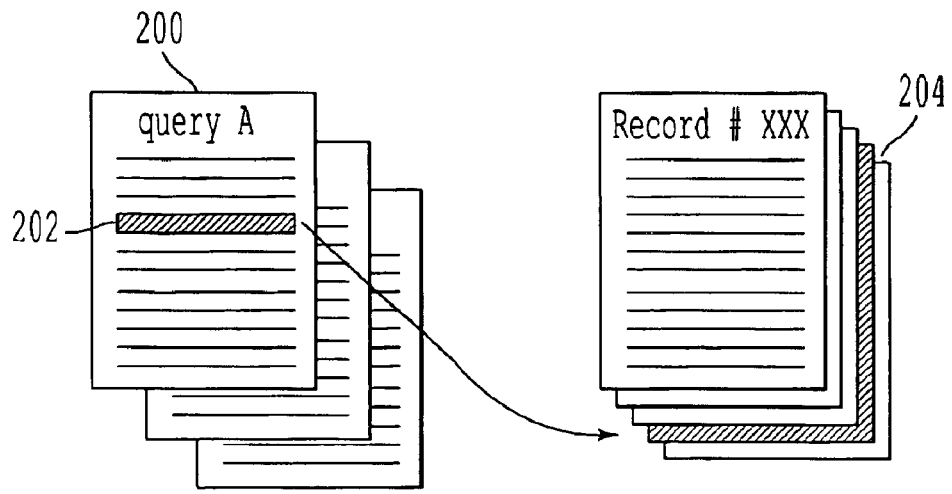
FIG. 3 is a diagram of an exemplary HTML- or XML-formatted list file with exemplary HTML- or XML-formatted detailed description files that belong to a specific category for the list file.

FIG. 3 is a diagram of a specific HTML-, XML-, or other markup language formatted list file 200 which includes tabular summary fields with hyperlinks to formatted detailed description files that belong to a specific category for the list file. The diagram illustrates how a client who finds the descriptive data in line 5, denoted 202, sufficiently intriguing to warrant further retrieval of complete information, is referred to an underlying detailed description electronic document file 204 where more detailed data for the descriptive data is located. Each line item in the table of the list file 200 corresponds to a specific detailed description file.

Figure 4A:
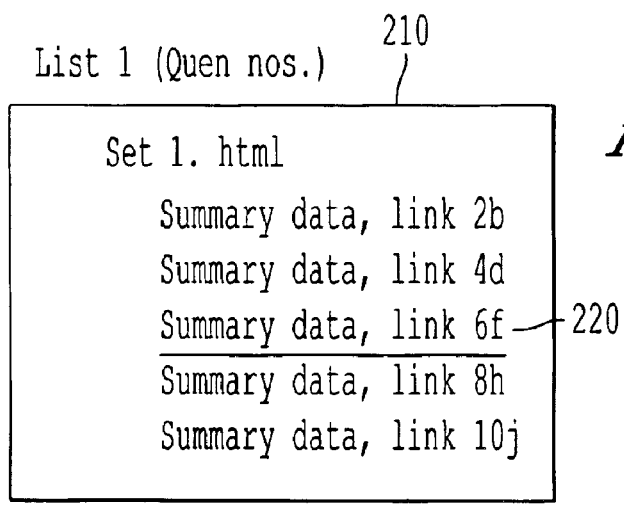
Figure 4B:
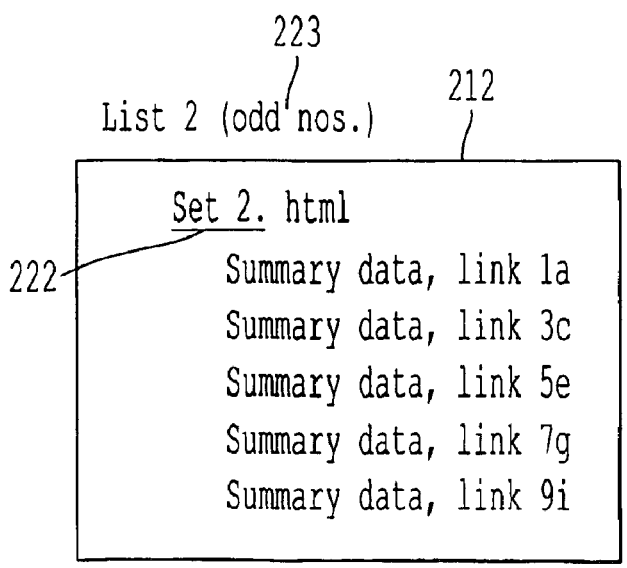

FIGS. 4A, 4B, 4C, and 4D are block diagrams showing the contents of various list files 210, 212, 214 and 216 with each list grouped into a common category list and having line items such as, for example, 220 with summary data for and hyperlinks to a record file in a set of record files 218 shown in FIG. 4E. The organization of category list files with line items having hyperlinks illustrate the relationship between the line items and the underlying electronic document files, or record files 218. Each line item in a list file includes an identification number 222, an item category 223, descriptive data 224, and a hyperlink 226 to the respective underlying electronic document file in the record files 218. For example, the list 210 contains links to all record files which have even record numbers. Accordingly, a set of one or more lists comprising a complete categorization of the entire set of underlying electronic documents into different groups is entered and modified. Each item in the group defines an item level, and the categorization of the entire set defines an hierarchical organization. FIGS. 4A, 4B, 4C, and 4D illustrate two parallel sets of independent categorizations, one having even and odd record numbers, and the other having record numbers in ranges, either less than six, or greater than or equal to six, that have been generated to offer clients different ways to approach the data as pre-defined "reports", or as "database query results", to use an analogy with classic dynamic web publications.

Figure 5A:
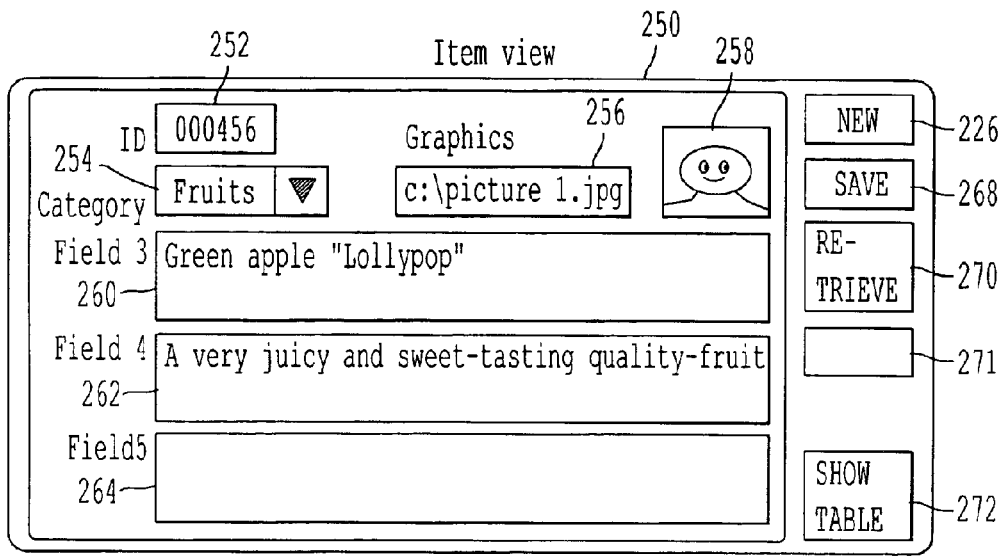
FIG. 5A is an exemplary "form" view for revision of a detailed item description.

FIG. 5A is a schematic view of one possible graphical user interface 250 for displaying, creating or revising an item description based on the invention. A text field 252 is used to display a unique identifier (labeled "ID") for a particular item. The ID is preferably generated by the system. A category field 254 is entered by a user. A text field 256 is shown as an optional feature related to adding graphical or other non-textual data elements (e.g., video or music) to the item description. A thumbnail graphic 258 is shown as a miniature image of a more detailed image which may be optionally stored as a graphic file. Both the thumbnail image and the more detailed image graphic files may be optionally stored as descriptive data. Field captions 260, 262 and 264 illustrate descriptive data fields for a specific underlying detailed description file. In one embodiment, a button 266 is used for requesting a view for creating a new item description. In alternate embodiments, a menu element or a hot-key may be used for requesting the view. (Menu elements and hot-keys may also be used for each of the functions described below instead of menu items). A button 268 is used to save the field data for the presently displayed item description. A retrieve button 270 is used to retrieve data for a previously saved item description. A text field 271 is used to communicate to the application which item to display when the retrieve button 270 is pressed. A "show table" button 272 is used to change from the current graphical user interface to a "tabular view" as discussed below with regard to FIG. 5B. It is possible to access the tabular view of the category (e.g., "Fruits") currently shown in the interface 250.

Figure 5B:
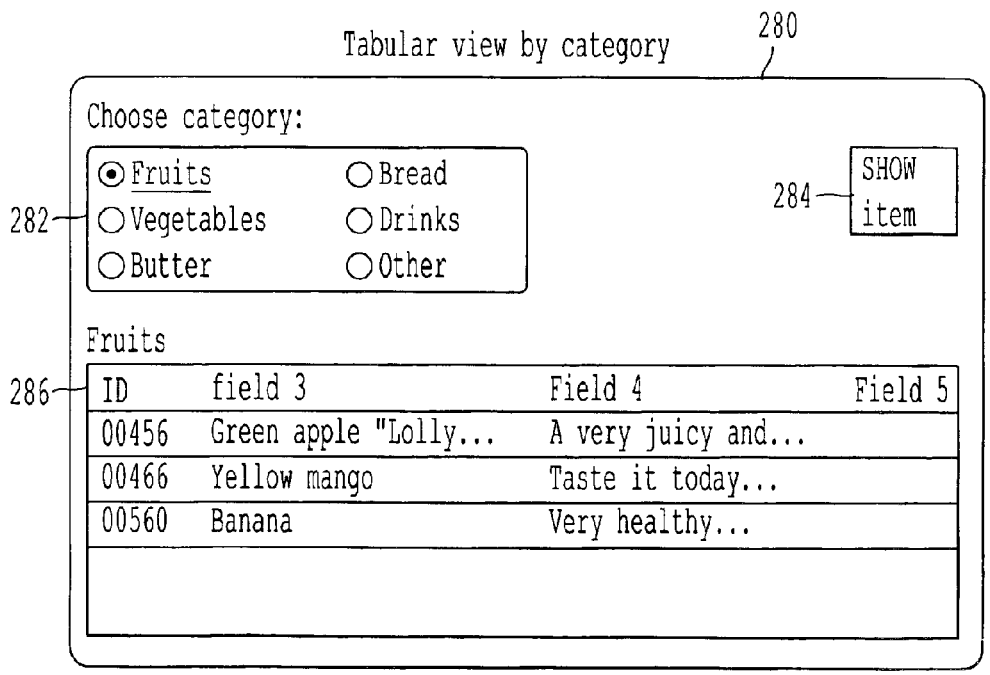
FIG. 5B is an exemplary "report" tabular category view.

FIG. 5B is a schematic view of one possible graphical user interface 280 for displaying a table 286 comprising data from all item descriptions belonging to a particular category, for the purpose of displaying an organized overview of existing data. Each line in the table contains data retrieved from one particular item description's set of fields. The user may toggle between data from other categories (e.g., by clicking a radio button 282 related to a specific category caption). A special button 284 may also be included for the purpose of switching from "tabular view" to "item view," as described with regard to element 272 of FIG. 5A. An extra feature may be included to make the system automatically display data from a specific item description that was marked in one way or another from the "tabular view" interface, for example by highlighting a line in the table 286 before selecting "item view."

Figure 6:
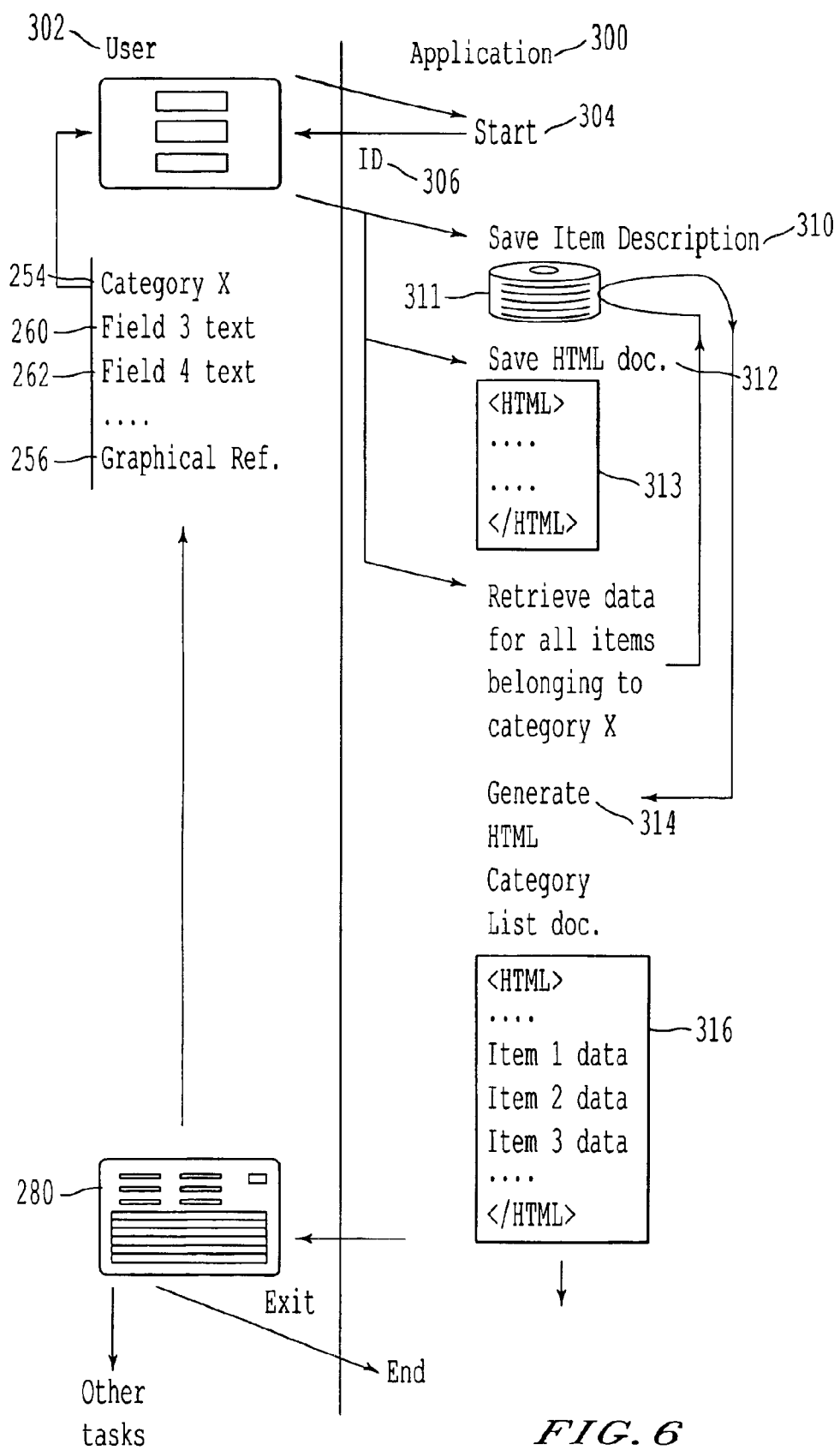
FIG. 6 is a flow diagram illustrating an exemplary flow of logic and data for creation and maintenance of files for item descriptions and category lists.

FIG. 6 is a flow diagram illustrating an exemplary flow of logic and data for creation and maintenance of files for item descriptions and category lists. The left-hand side of FIG. 6 illustrates actions from, and display for, a user 302 who adds and revises data in the given publication. The right-hand side shows actions performed by an application 300 on behalf of the user according to the invention. At step 304, the user 302 starts the application 300. One of the application's graphical user interfaces, in this case the "item view" as discussed previously with regard to FIG. 5A, is opened. The application 300 of FIG. 6 automatically allocates a reference code or ID 306, for example a unique number that is not already used as an ID for another item description (optionally displaying it in one of the editable text fields 260, 262 or 264 of FIG. 5A). If the user 302 edits this ID 306, the system may automatically control that the new code is also unique, and warn the user 302 if it already exists.

The user 302 enters data into different fields 260, 262, or 256 where at least one field 254 is used to categorize this item. When the user 302 chooses to save this item's data, step 310 stores the data in a database file 311, or as a single text file where a file name convention may define both the ID code and what category this file is a part of. This makes it simpler and faster to filter out all files belonging to a specific category, and to retrieve data for a specific item description. This procedure also ensures that an existing file is not unintentionally overwritten, since the ID code is unique for each item. Control is then passed to step 312 in which the system generates and stores an HTML-formatted file 313 for this example, the "detailed description document," where the contents of various data fields are embedded in accordance to a predefined page layout scheme or template. This file's field name should contain the ID code 306 for this item. The design template should also include a hyperlink to the "category list file" to which this item belongs. It is noted that it is not required to store both the text file and the HTML-formatted file 313, as one or the other may be stored and used for retrieval of needed item data without departing from the spirit of the present invention. For example, the text file may be utilized to create an HTML-formatted document on-the-fly when needed, and conversely, the information of the text file may be obtained from an HTML-formatted file by parsing the file for text information.

Following saving of the item data, the system re-generates (in step 314) the "category list file," an HTML-formatted file 316 illustratively including at least (1) a headline field with the actual category name for the present item and (2) a tabular view displaying the contents of at least one of the fields from each item description belonging to the given category. Further, one or more of the table cells displaying data for a given item may include a hyperlink to the specific HTML file that was previously created for this item. In order to update the contents of the table 316, the system opens and reads the contents of all files or database records 311 to locate all records belonging to this particular category to include in the updated list. The category list document's name should include a specific category ID code, for example an alias for the actual category caption. This alias is referenced in the hyperlinks that are included as part of the design template for the item descriptions that belongs to this category.

After the category list document has been saved, the system may display the tabular view, or "report view," graphical user interface 280 for the application, as discussed previously with regard to FIG. 5B, where the user may begin a new turn with adding a new item description or revising or deleting an existing one. The graphical user interface 280 may also include command buttons or menu elements for other tasks, such as, for example, "Update Internet," "Print," "Fax," "Exit," and so on. The "Update Internet" event will revise the external web server's markup language formatted item documents and their accompanying category list documents, in accordance with the changes to the same set of documents that have been made on the local computer or LAN since last "Update Internet" event. It is noted that the updating of category list documents may be delayed until a next "Update Internet" event without departing from the spirit of the invention.

Document contents may be stored and updated on a local network server in order to allow more than one computer on the local network to revise the contents of the documents. An another alternative, an external database on the local PC or local network server is connected to the local system in order to automatically import the contents of specific electronic document files from the external database into defined data fields in the computer program so that duplication of effort can be avoided.

Figure 7:
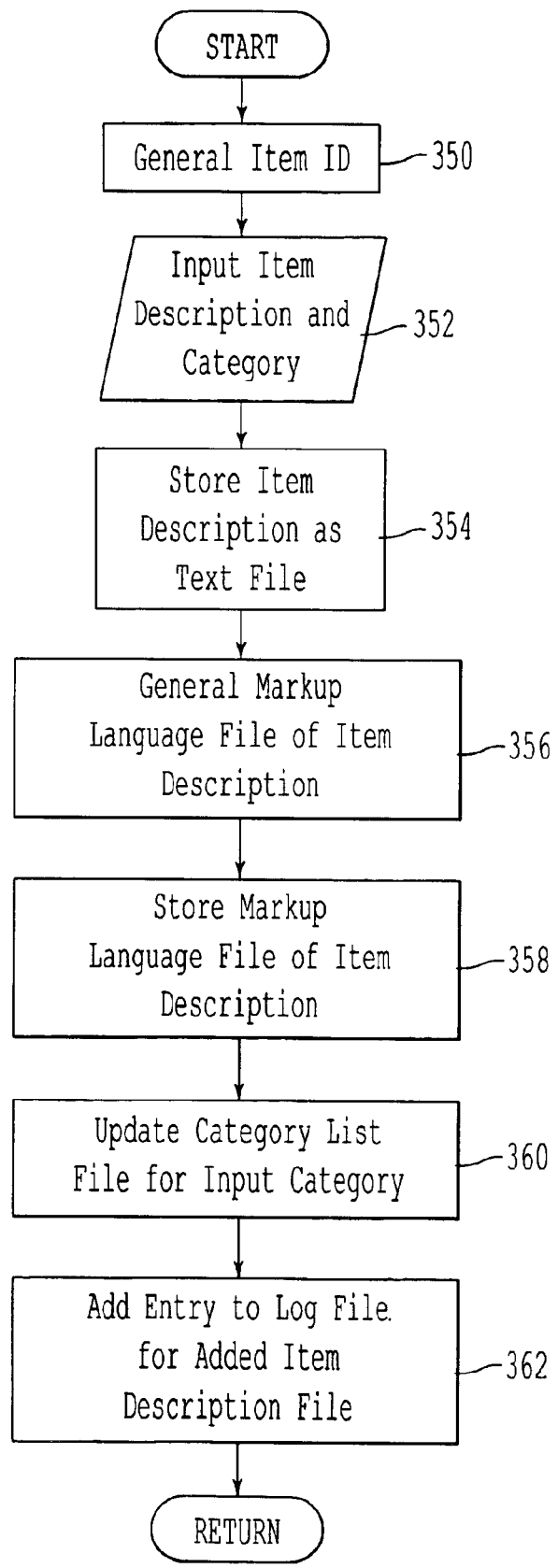
FIG. 7 is a flowchart of exemplary logic for adding a new item description.

FIG. 7 is a flowchart of exemplary logic for adding a new item description. After starting, step 350 generates a new item ID. As discussed previously with regard to ID 306 of FIG. 6, this ID may be generated by the system or by the user. Step 352 of FIG. 7 then inputs an item description and a category. The item description may, for example, be entered into one of the fields 260, 262 or 264 of FIG. 5A. The category may, for example, be entered into the field 254 of FIG. 5A.

Step 354 of FIG. 7 then stores the item description as a text file, as discussed previously with regard to element 311 of FIG. 6. Step 356 of FIG. 7 generates a markup language file of the item description, as discussed previously with regard to element 313 of FIG. 6. As noted previously, either one of the text file or the markup language file may be saved without the other being saved without departing from the spirit of the invention, as the information which is needed by the system is sufficient when stored in one or the other of these files. Step 360 updates the category list file for the category which has been input, corresponding to step 314 and category list file 316 of FIG. 6. Step 362 adds an entry to a log file for revised item description files, keeping track of added, revised and deleted items since the last update event. As discussed previously, the log file is used by the system to update local changes to the external server. Control is then returned to the calling process.

FIG. 8A shows an exemplary display of an HTML-formatted category list file 400, and FIG. 8B shows an exemplary display of a detailed description electronic document file 402. As previously discussed, the information which is retrieved with a web browser in a WMT-generated web publication structure comprises a set of markup language files, such as, for example, HTML-formatted or XML-formatted text files, which are records, or "detailed descriptions," one detailed description electronic document file for each record. The system also includes various sets of accompanying category list document files, which comprise markup language text files which include tables with summaries and hyperlinks to detailed descriptions for a given category.

Thus, as shown in FIG. 8A, a given set of category list document files each containing a category-specific tabular presentation of underlying detailed descriptions covers the whole set of detailed description files belonging to this category, normally without overlap. Since there normally is no overlap between categories in a given category set, the number of list files is very limited compared to the number of detailed description files in a given implementation. Alternative sets of list files, for example, an alternative set "alt_set1.html", "alt_$_{set}$2.html", . . . , may offer links to the same records, but they are based on other query definitions.

For example, a real-estate agency may offer its search page visitors a choice between inventory tables for three different ranges of price, three for area, and fifteen for different local area zones. The three sets of tables (3+3+15 static web pages) in this example effectively cover the most common query requests from home page visitors. In sum, they also cover the complete set of records, illustrated as properties for sale, in this example, from three different perspectives: price, area and locality. The local computer or server's hierarchical directory or folder structure together with specific structuring of the underlying electronic document file names represent the database organization, rather than pointers to records as in a conventional database.

The address "http://yourcompany.com/presentation1/set1.html" may point to one of several data-organizing category list files. The "set1.html" file contains line item data in tabular summary form for all records (i.e., "items") that are defined to belong to this specific set, or category, of records. Each line item includes summary data (e.g., a thumbnail graphical image, a categorization field, an identification number field for the given record, and a hyperlink to the record's web page (i.e., the detailed description document "nr000333.html") which contains detailed data field contents for this record with the record identification number "nr000333"). All list files in a given set, for example, set1.html, set2.html, etc., are conveniently located at the same directory "/presentation1", indicating that they, as a group, present a superset of "presentation1" records. This superset is analogous to a given database in a database-centric web page system. From a user's perspective, a given set of line items in a list file is analogous, in a database-centric web page system, to a database search engine query result from a predetermined, or fixed query.

The hierarchical structure makes it possible to publish a well-organized structure of a large number of detailed descriptions. For example, 10,000 detailed descriptions may be organized into five major "databases," preferably split into five different hard disk directories, each embedding, for example, 10 categories. In this 3-level system, "list of databases" comprises level 3, and each list file at level 2 will include only 10000/(5×10)=200 detailed descriptions at level 1, on average. One of the detailed description documents at level 1 can be accessed from just three hyperlinks: select database, then select category under the selected database, and next select a detailed description under the given category. Smaller numbers of detailed descriptions may be organized with fewer levels, for example by publishing only one database. For example, 150 records may fit conveniently into a three-level system consisting of one data set with 15 categories, wherein each category's list file, on average, will include hyperlinks to 10 detailed descriptions.

In the present invention, a static home page may appear to a user to function similarly to a "search engine" or search page, since it gives the links, in the form of, for example, drop-down boxes, graphical buttons, clickable maps or simple texts, to the various sets of query results, or reports that are automatically maintained for a given set of detailed description files. Referring to the previously discussed real estate example, the search page is where a user selects one of the predetermined "queries," for example, by clicking a hyperlink. Thus, a user may request a particular list file from one of the three sets of list files in the real estate example discussed above.

FIG. 8C is an exemplary search page 410 for three parallel sets of categorical list files, displaying a clickable map 412 or an alternative drop-down box 416, and two drop-down boxes 418 and 420.

The example discussed above with regard to FIGS. 8A and 8B describes a three-level hierarchical structure, with level3 (including hyperlinks to various "databases," such as "presentation1," "presentation2," etc.), level 2 (including the sets of category list files belonging to a given "database," for example, "set1," "set2," etc.), and level 1 (including the set of detailed electronic document files referred to from a given list file, such as "nr000333.html," "nr000378.html," etc.). Other levels may easily be added, by including more levels of list files to the structure discussed above. For example, the list file set "set1," "set2," . . . at level 2 discussed above may include hyperlinks to detailed electronic document files, which are on level 1, which describe a new set of subcategories for each of the categories at level 2, which includes one subcategory for each detailed electronic document file. Each of these subcategory descriptions includes a hyperlink to the actual category list files for these subcategories. Further, these subcategory category list files include hyperlinks to their respective sets of electronic document files, or a level 0 description, below level 1.

By navigating between the search page, the list files, and the detailed electronic document files by using an Internet browser program, the user observes results similar to the query results of a search engine that is connected to a web server database. Each detailed description file may include links back to the referring category list file, or to the search page. However, the "database" comprises a set of static web pages that are connected by the automatically updated and revised category list files. The solution is "pseudo-database-centric," with specific advantages that are not obtained from existing static web page solutions nor from database-centric solutions.

The markup language, for example, HTML-formatted or XML-formatted category list document and detailed description electronic document files are semi-static, since the respective detailed description electronic document files and referring category list document files are frequently generated, re-generated, or deleted by a specially designed computer program such as, for example, NetSpinner. NetSpinner is not crucial for the functionality of a WMT system. However, it is a software tool which is available for building and revising the hierarchical set of markup language files, for example, HTML-formatted or XML-formatted category list pages and detailed description electronic document files as discussed above, in conjunction with its updating of structured text files (i.e., the content files) that include data without markup language tags. These latter files are analogous to database records in a database program. The actual updating of the markup language (e.g., HTML or XML) files takes place in the same automated sequence of events when new records are registered or old records are updated or deleted in a local in-office text-file "database" that is connected to the NetSpinner program.

Figure 8D:
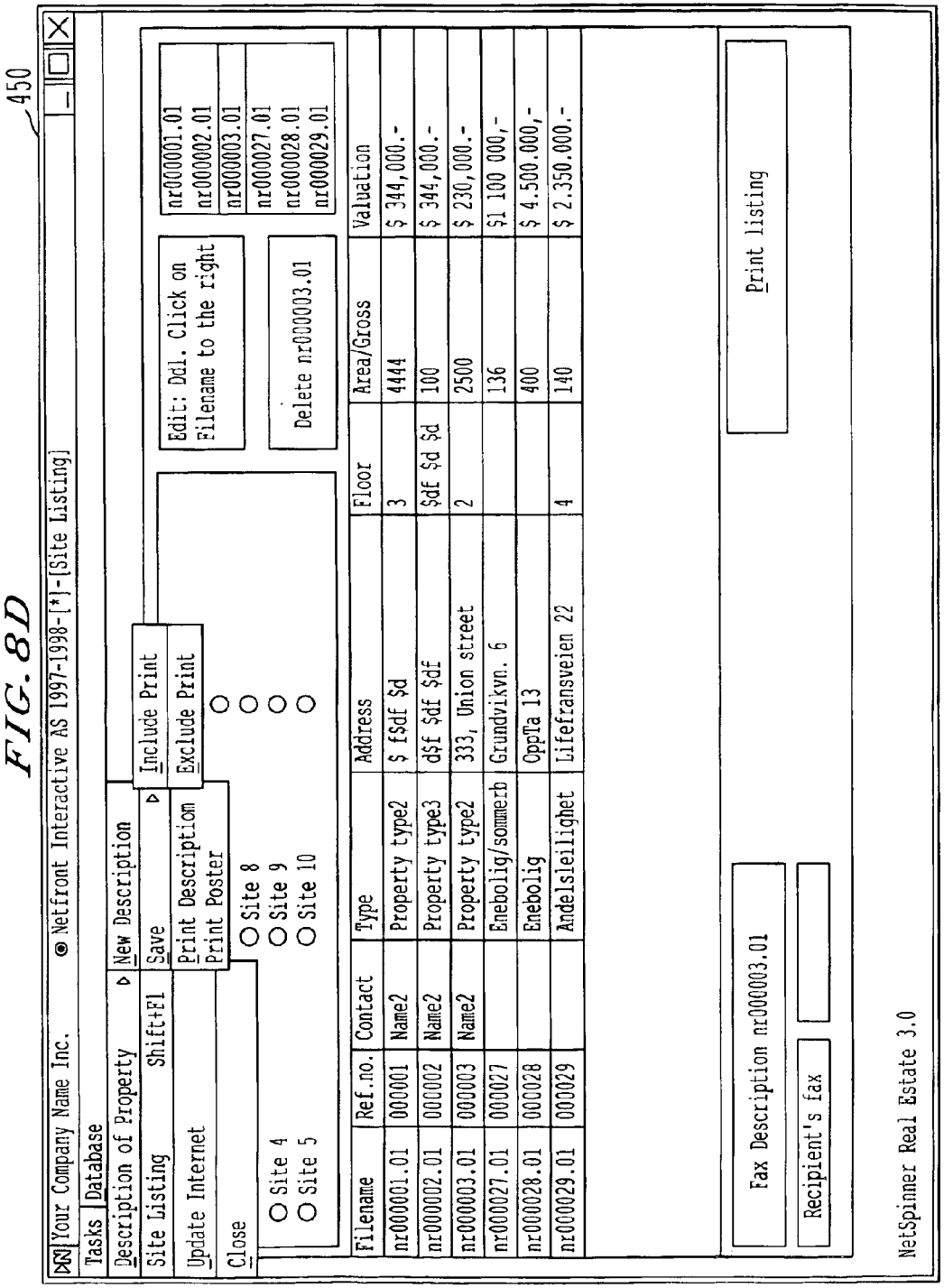
Figure 8E:
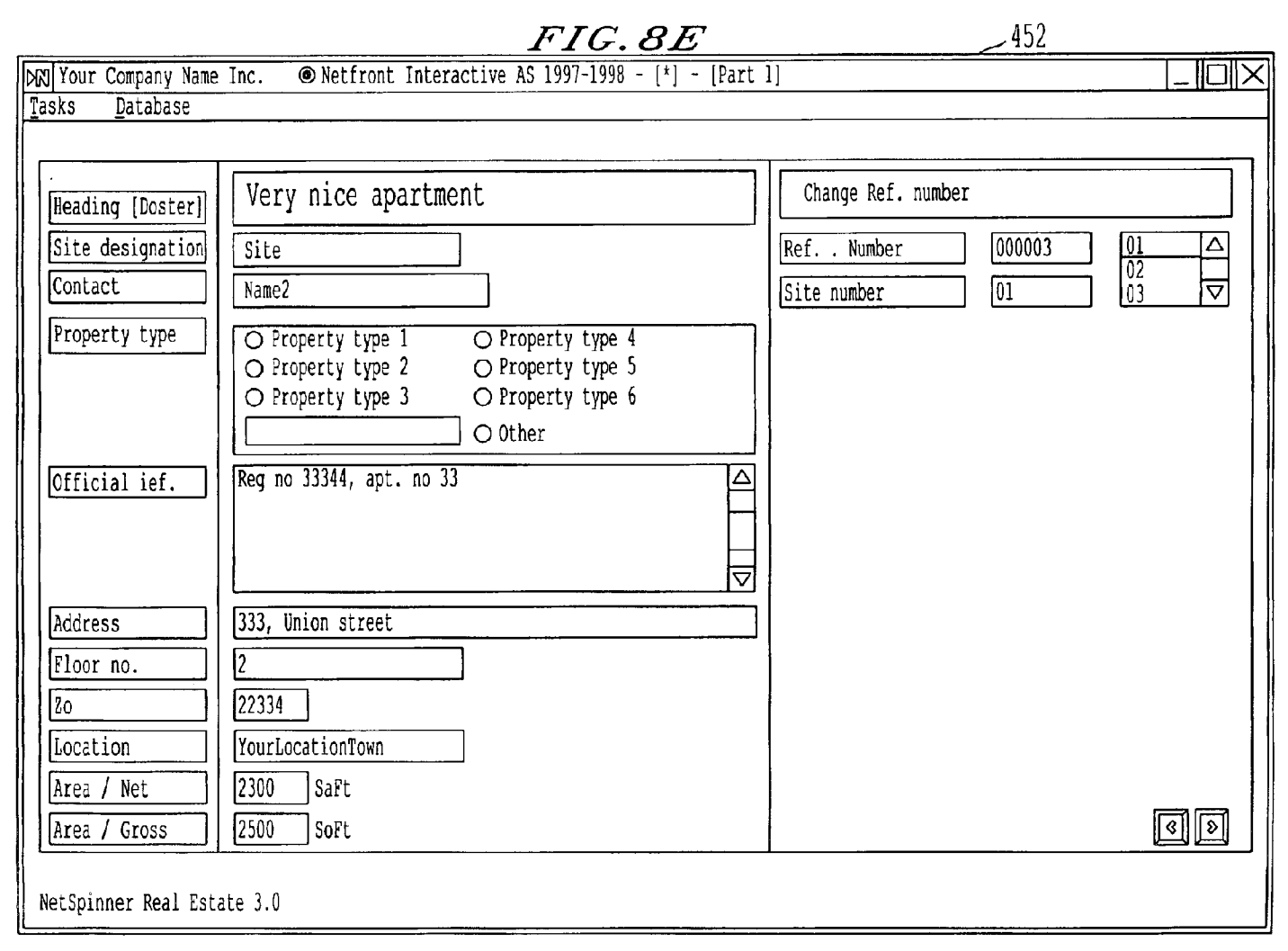

FIGS. 8D and 8E illustrate an exemplary startup page of an exemplary graphical user interface after the user has expanded a menu, similarly to FIGS. 5A and 5B. Referring now to FIGS. 8D and 8E, a local database administrator or contents editor fills in data or revises existing data in pre-defined fields for a given record in a NetSpinner graphical user interface 450 of FIG. 8D. The "report (tabular view)" is shown in 450. A graphical user interface 452 of FIG. 8E illustrates a page layout for a given detailed description data field, resembling a "form view" in a database-centric program, where new item descriptions may be added and where existing items may be revised or deleted.

Figure 8F:
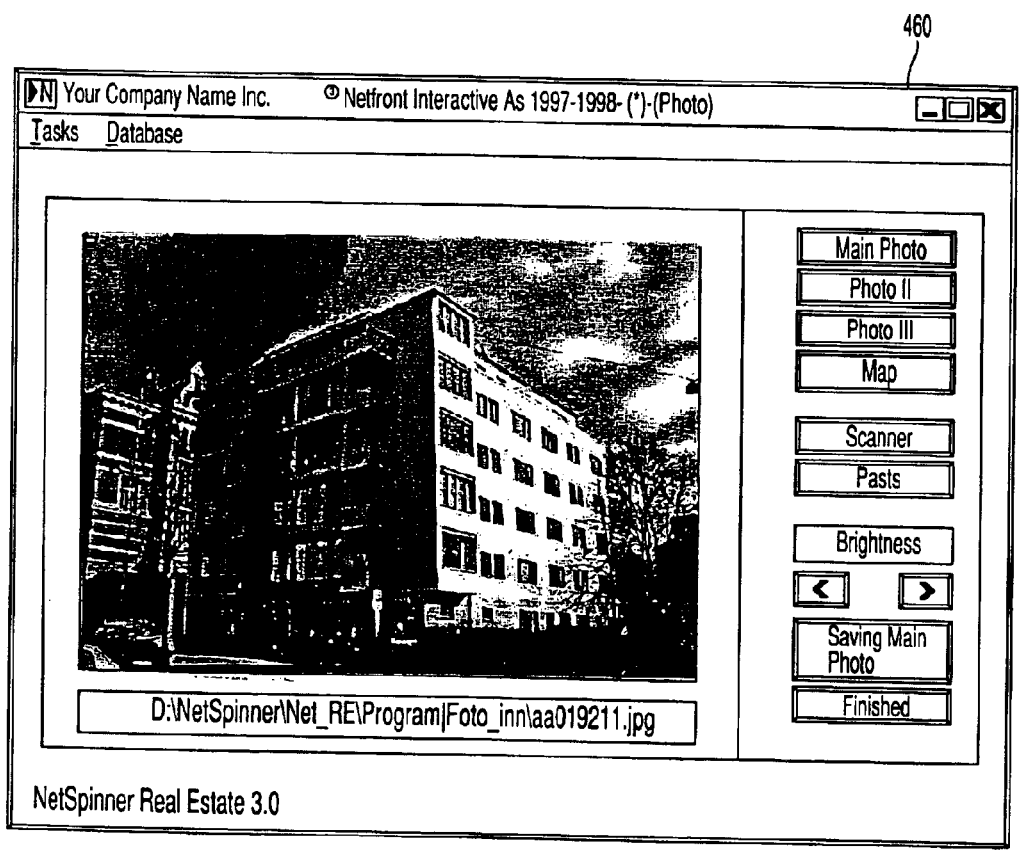
FIG. 8F illustrates an exemplary graphical image defined to be a part of an item's description.

FIG. 8F illustrates a subset screen 460 for a descriptive fields presentation including a display of a graphical image file. In a preferred embodiment, NetSpinner will automatically create both thumbnail graphical image files and larger high-quality image files with corresponding file names that can be used as hyperlink targets from category list pages, as well as from detailed electronic document pages in the WMT-generated web publication. For example, the file name "aa000333.jpg" may refer to a high-quality picture for a graphical image for a detailed description file "nr000333.htm," while a file name "ab000333.jpg" may refer to a thumbnail version of this image.

One main advantage of the WMT publication is its freedom from database dependency in classical terms. Data may be stored and retrieved from a simpler structure such as, for example, a "pseudo-database" comprising separate text files for each detailed description. Consequently, when a user selects the "save" command, NetSpinner saves the current detailed descriptive data in a specially formatted text file with a unique identification number and set identifier file name, for example, "nr000333.01," where ".01" denotes that the record belongs to the set or category "01." Further, NetSpinner generates an accompanying markup language (e.g., HTML-formatted or XML-formatted) version of this record, for example, "nr000333.htm," which includes relative hyperlinks to the accompanying graphical images, if present. NetSpinner also makes the necessary revisions of the list file that includes the tabular summary of all detailed description electronic document files in the set to which the actual record belongs, or the markup language (e.g., HTML-formatted or XML-formatted) category list file ("category01.htm"). For example, a new line is added for the category list file if "nr000333.01" is a new record. Similarly, if the user, while revising the existing record "nr000333.01", chose to delete that record from its record set, then the line in the list with the hyperlink that corresponds to "nr000333.htm" is deleted.

As discussed previously with regard to FIG. 7, NetSpinner maintains a log file comprising file names of all item descriptions that have been added, revised, or deleted in a given "database" from any workstation on a local network. By selecting the NetSpinner command "Update Internet," an administrator can automatically delete all external web server files corresponding to locally deleted files and copy all locally added or revised files, including graphics, using any file transfer protocol (e.g., standard File Transfer Protocol ("FTP"), trivial File Transfer Protocol ("TFTP"), or HyperText Transfer Protocol ("HTTP")), to the external web server based on the log file's overview of which files to copy to or delete from the external server. The log file is then emptied and thus is available to be filled with a new log of added, revised or deleted item descriptions. The "Update Internet" event can also be automated, by setting a timer function to perform updating at regular intervals. The frequency of updating the external web server defines how close the WMT-produced sets of web files match a traditional dynamic search engine or database-centric web page updating on an Internet server. On a local server or PC, the update process takes place in real-time for both systems.

After an "Update Internet" event as described previously, the external copy of the NetSpinner-generated set of HTML-formatted files, which are category list files and detailed description electronic document files, in addition to graphical images, is identical to the local set of files. During the "Update Internet" event, NetSpinner deletes all files on the external server in accordance with files that have been deleted on the local server or PC.

The NetSpinner program may alternatively include other functions such as, for example, local printing or faxing of lists and detailed descriptions, and even sharing the data files with other programs such as a "Fax-On-Demand" service. The NetSpinner program may be set up to automatically export files, for example, summaries of detailed descriptions, to a local or external server in order to update a larger classical client/server database system. The external database system handles the automated import function. This setup may be used, for example, when data from several WMT-based local datasets should be merged into a common search engine system offering general overview and hyperlinks back to the local data sets, thereby offering a functionality and service similar to yellow pages in a telephone book.

Figure 9A:
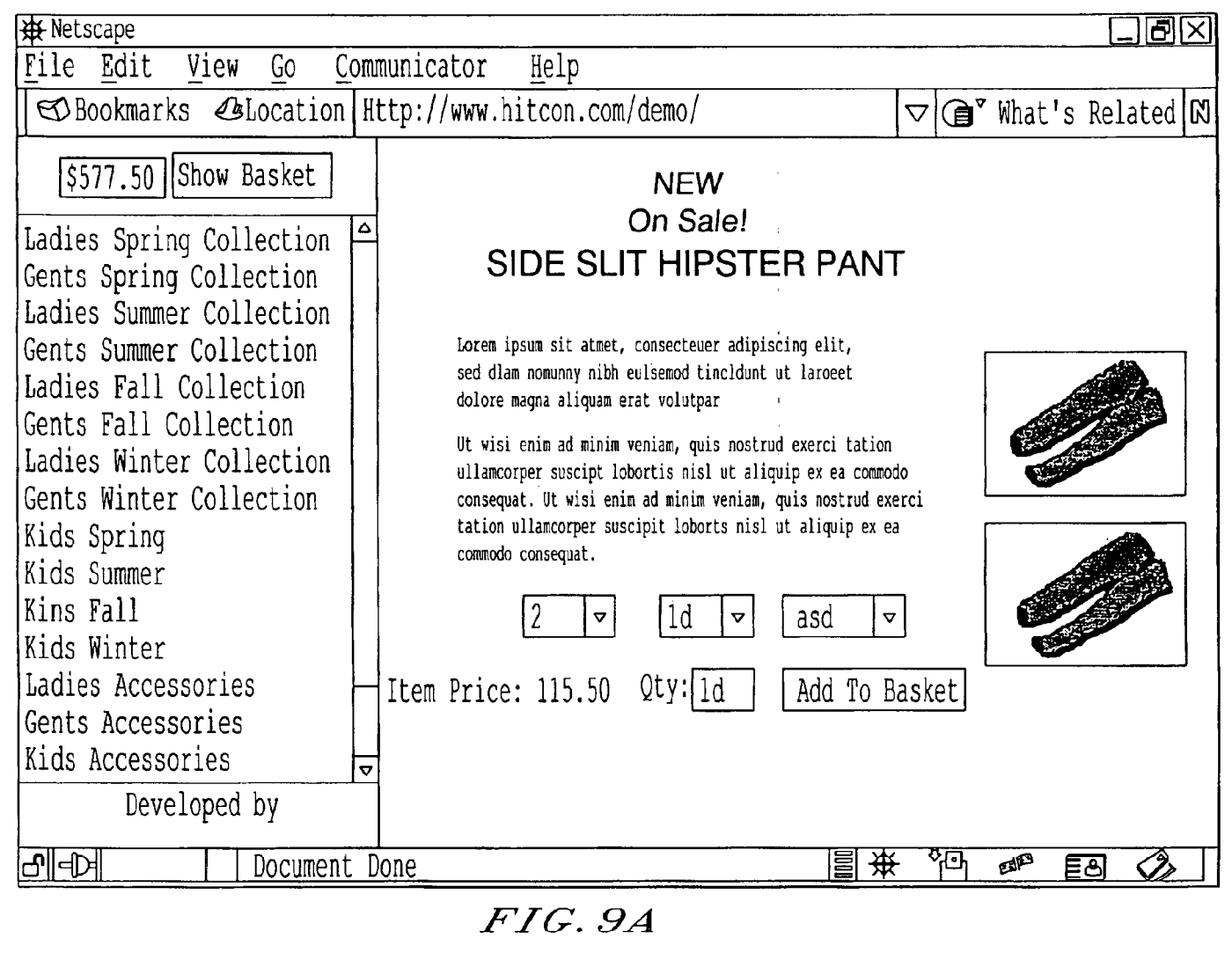
Figure 9B:
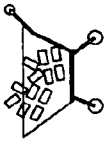

The NetSpinner program may alternatively include algorithms for maintaining unique record identifiers, or record numbers, making it possible to move electronic document files from one set or category to another, to change the identification number, etc. The program may also allow for different markup language designs for different "databases," by reading markup language design tags from a set of external, and modifiable text files, wherein one set of such files comprises a given web page design template. A specific template may, for example, include client- or server-side script commands and algorithms for a shopping basket e-commerce system, including "on-the-fly" listing and cost calculation of items that have been added to the basket. In addition, an order submission form that is connected to a webserver script or program for further processing can be included as shown, for example, in FIGS. 9A and 9B. FIGS. 9A and 9B are exemplary shopping basket templates for web design including hyperlinks to a set of list files.

The NetSpinner program may include a menu of several databases, each including their respective set of data categories, web design, etc., for files having different hard disk directories for each database. Under each database directory, markup language files (e.g., HTML or XML files), graphical files, record files, and template files should preferably be located in a hierarchical structure to ease file overview and access speed, and to minimize or eliminate occurrences of directories containing a very large number of files.

An example of a hard disk directory structure for one WMT-generated dataset and its accompanying computer program with its template and initiation files is shown in Table 1. Three dots (" . . . ") indicates that only a small number of a larger set of files of the given class is shown. Several parallel sets of directories on level1, such as, for example, Presentation2, Presentation3, etc., may be administered by the same NetSpinner program, for example, netspinner.exe at level 4, but each presentation may have its own settings in the template and ini-files at level 4. An ini-file is a text file containing various parameters for the system setup such as, for example, field captions, location of various file types, etc. In NetSpinner, one can allow for other program settings that can be easily modified if the settings were read from various text files, such as ini-files. Such files instructing NetSpinner to update the local website copy only de-activates the "Update Internet" FTP or HTTP function. This incorporation could be a feasible option for various Intranet solutions and for cases where the web server is directly connected or identical to the local network server, hence eliminating the need for an external copy of web site data.

TABLE 1

| Directory Level 1 | Directory Level 2 | Directory Level 3 | Directory Level 4 |
|---|---|---|---|
| Presentation1 | Data | HTML_files | nr000333.htm |
| | | | nr000338.htm |
| | | | nr000456.htm |
| | | | . . . |
| | | | alt_set1.htm |
| | | | alt_set2.htm |
| | | Graphics | aa000333.jpg |
| | | | aa000333.jpg |
| | | Records | nr000333.01 |
| | | | nr000338.01 |
| | | | nr000456.02 |
| | Program | Program_files | netspinner.exe |
| | | ini_files | html_template.ini |
| | | | print_setup.ini |
| | | | FTP_setup.ini |
| | | | field_names.ini |

With the help of the automated functionality of NetSpinner, the frequent updating and maintenance of even a large set of document files is a simple procedure, even on a standalone low-cost PC with a modem connection to the Internet. Typically, the saving of a detailed description record and the accompanying updating of the markup language (e.g., HTML-formatted or XML-formatted) detailed description electronic document file and the connected category list files takes less than a second on a modern PC. The magnitude of data is not a serious obstacle for low- or medium-size databases, so long as the record files can be subdivided into a hierarchically structured database and category tree, based on main data category classes. NetSpinner may also be set up to automatically split long list files into a set of files, so that list file 1 shows a list for detailed descriptions #1–50, plus a hyperlink to part 2 of the list, in a separate file, with detailed descriptions #51–100, etc.

Since the WMT is based on very simple protocols (e.g., FTP and HTTP), it puts very little demand on line bandwidth, local hardware quality and information technology webmaster know-how. One may simply use a normal telephone and a modem, and the running costs are very small. Typically, the daily updates require only a few minutes a day. Further, the need for expensive around-the-clock webmaster maintenance is practically eliminated, since the need for complex script processing and traditional web-based database maintenance is reduced. Locally generated and web-formatted tables and database records are simply copied to the Internet site from the local network server or even from a stand-alone PC.

In the above described embodiments, the WMT system operates independently of a database. In an alternate embodiment, the system connects to an external database system on the local PC or network server in order to import or export data records from or to such a database system. In this way, duplication of effort may be avoided in connection with updating specific data in two parallel systems performing different tasks. This would also simplify the initial filing of data into a new WMT-based publication.

A database-less WMT-based system has no database downtime, as long as the Internet server itself is running properly. In the worst case, the data that are published on the external server may be partially outdated if the FTP-procedure does not work properly. However, fixing FTP connection problems is normally a less complex task compared to many other problems that are encountered when traditional databases stop functioning properly. If a NetSpinner system should experience problems, at least the latest copy of the data is accessible both on the local and the external server. With the WMT system, one can easily maintain updated complex static web publications well into the domain that traditionally has been considered an environment for database systems (e.g., a client/server solution). In many instances the described system offers unique properties which function better than database-centric web page solutions, due to the combination of the innate simplicity of static web pages and the inclusion of some organizational principles from database structures. In addition, a static web page structure can handle a much larger hit rate compared to database-centric web pages, especially when compared to simple database organizations that are not of the client/server type, before server response time becomes a problem.

In short, the WMT makes dynamic page publishing a realistic and attractive option even for small companies with a limited investment capacity for Internet presentations. WMT comprises a process wherein an external server's copy of the publication is kept synchronized with a local copy. Thus, WMT is an embedded feature inside NetSpinner. NetSpinner is one of many possible graphical user interfaces that could be applied for the task of updating and maintaining a database-free hierarchical structure of web documents. NetSpinner resides on the local computer, with full local control.

Figure 10:
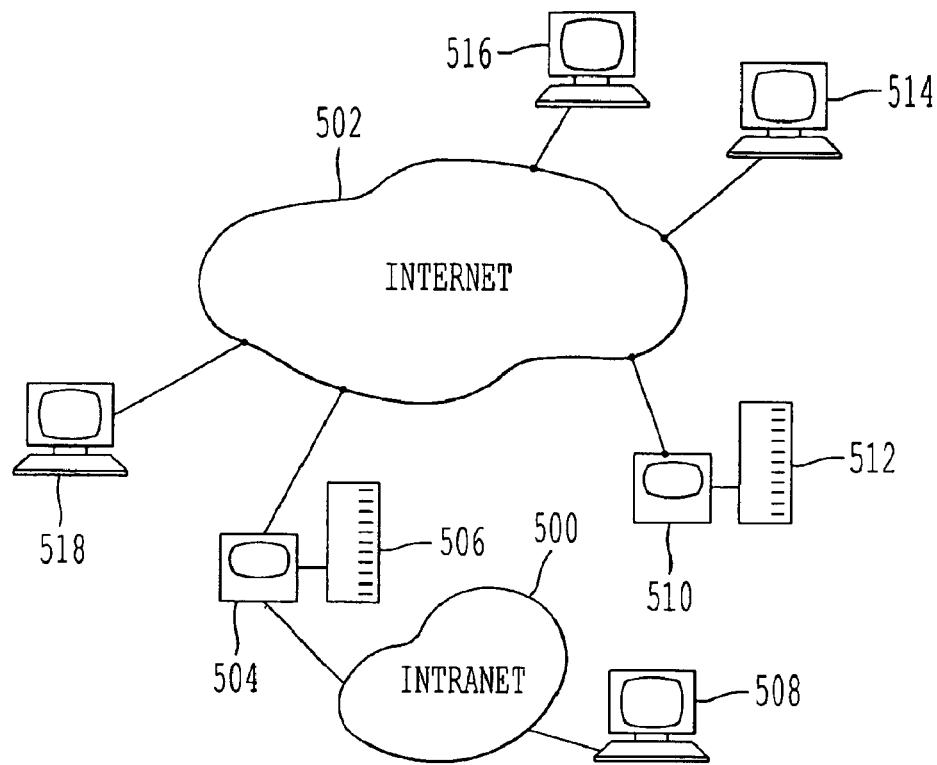
FIG. 10 illustrates an exemplary portion of a generalized computer system upon which portions of the invention may be implemented.

FIG. 10 illustrates an exemplary portion of a generalized computer network system upon which portions of the invention may be implemented. The Web Mirrorring Technology and NetSpinner exist on a local computer 504 or within a local Intranet 500 at a company's LAN. Archived data containing hierarchical information for the website publications is stored as text files on the local server 506 or local computer 504 and is maintained by the NetSpinner program which resides on the server 506 or on the hard drives of one or more local computers 504. Informational data may be incorporated into the server's files from other computers such as 508 within a company's Intranet. The WMT produces on an ISP's server 512 a copy of the static web pages on the local computer 504, or LAN server 506. All of the local computer 504, the local server 506, and the ISP's server computer 510, as well as client computers 514, 516 and 518 are connected by a Wide Area Network (either private or public, e.g., the Internet 502). Clients logging onto the Internet access the company's home pages through the ISP server 512. Information is available to the clients without having to depend on dynamic database connection, either from the ISP server 512 or the local server 506. The WMT updates the static server files on machine 512 to present the latest web page information on server 506. The exemplary arrangement in FIG. 10 may be simplified by removing the Intranet 500 and LAN server 506, and connecting the local computer 504 directly to the ISP server 512.

Figure 11:
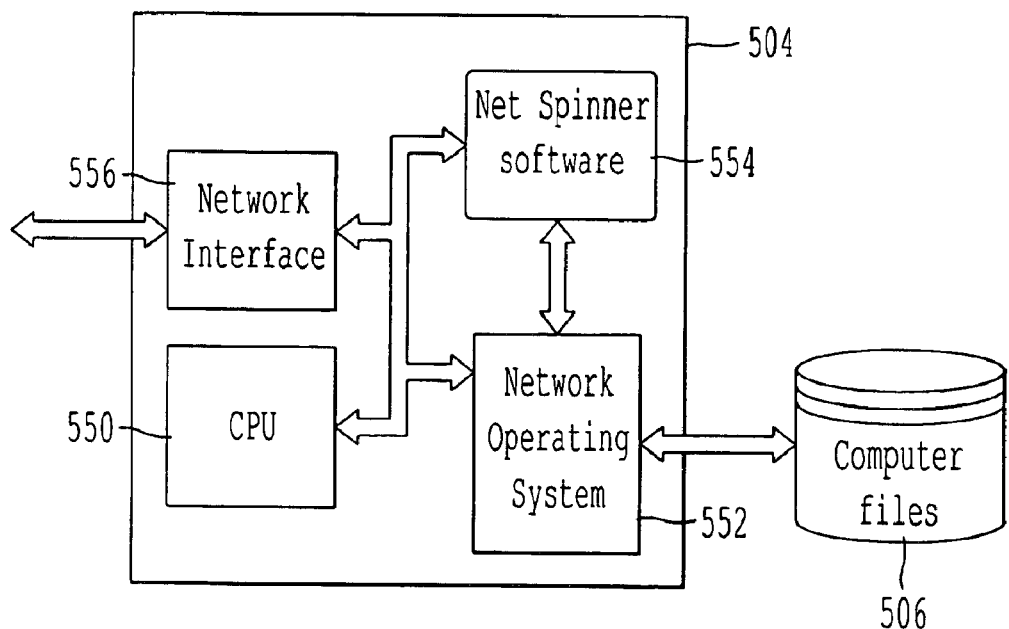
FIG. 11 illustrates an exemplary portion of a generalized hardware configuration, in the format of a workstation, upon which portions of the invention may be implemented.

FIG. 11 illustrates an exemplary hardware configuration of a local computer upon which portions of the invention may be implemented. The local computer 504 of FIG. 10 includes a CPU 550 as shown in FIG. 11, a network operating system 552, a network interface 556, NetSpinner software 554, and computer files 506. The local computer 504 processes input data and stores the data in an appropriate predefined but modifiable web page design. The NetSpinner software facilitates editing of the stored data files and transferring of updated electronic document files or category list files to the ISP server computer 510 of FIG. 10. This data, as previously discussed, is grouped into hierarchical categories and saved with summary data and hyperlinks to the record files containing detailed information about each line item in a list. The network operating system 552 permits file transfer and file copying using standard file transfer protocols such as, for example, FTP or HTTP.

This invention may be conveniently implemented using a network of conventional general purpose digital computers and/or microprocessors programmed according to the teachings of the present specification, as will be apparent to those skilled in the computer art from reading the above descriptions regarding the figures. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer or a plurality of networked computers to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Stored on any one or on a combination of computer readable media, the present invention includes software for controlling both the hardware of a computer and for enabling the computer to interact with a human user. Such software may include, but is not limited to, device drivers, operating systems and user applications, such as development tools. Such computer readable media further includes the computer program product of the present invention. Computer code devices of the present invention can be any interpreted or executable code mechanism, including but not limited to scripts, interpreters, dynamic link libraries, Java classes, and complete executable programs.

Obviously, numerous modifications and variations of the present invention are possible in light of the above teachings. It is therefore to be understood that within the scope of the appended claims, the invention may be practiced otherwise than as specifically described herein.

What is claimed is:

1. A method for production, revision and hierarchical organization of electronic documents on a computer system, comprising:

inputting a first item description and a first item category;

generating a first item identifier corresponding to the first item description;

generating a first item description electronic document in a plurality of item description electronic documents including the first item description, the first item category and the first item identifier;

storing the first item description electronic document in a first digital storage area in a first computer;

collecting at least one existing item description from at least one respective existing item description electronic document in the plurality of item description electronic documents, each of said at least one respective existing item description electronic document including said first item category, and a copy of each of said at least one existing item description electronic document being already stored on a second computer;

generating a first category list electronic document, in the first computer, corresponding to the first item category prior to receiving a request for the first category list electronic document from a web browser, said first category list electronic document including at least a portion of the first item description and a reference to the first item description electronic document in the plurality of item description electronic documents, and at least a portion of each of the at least one existing item description and a reference to each of the at least one respective existing item description electronic document in the plurality of item description electronic documents;

determining if any of a copy of the first item description electronic document and each of the at least one existing item description document are already stored on the second computer; and initiating a transfer of a copy of the first category list electronic document and a copy of at least one document determined by the determining not to be already stored on the second computer, and not initiating a transfer of the copy of at least one document determined by the determining to be already stored on the second computer.

2. The method of claim 1, wherein the step of inputting the first item description further comprises inputting data into at least one item description content field and the step of storing the first item description electronic document further comprises storing the first item description electronic document in the first digital storage area in the first computer using a first file name corresponding to the first item category and the first item identifier.

3. The method of claim 1, wherein the first item description electronic document comprises one of a text formatted first item description electronic document and a markup language formatted first item description electronic document.

4. The method of claim 1, further comprising:

inputting a second item description and a second item category;

generating a second item identifier corresponding to the second item description;

generating a second item description electronic document including the second item description, the second item category and the second item identifier;

storing the second item description electronic document in the first digital storage area; and generating a second category list electronic document, in the first computer, corresponding to the second item category to include at least a portion of the second item description and a reference to the second item description electronic document, prior to receiving a request for the second category list electronic document from a web browser.

5. The method of claim 1, wherein the step of storing the first item description electronic document further comprises:

storing the first item description electronic document in a database in the first computer.

6. The method of claim 1, wherein the step of generating the first item description electronic document comprises:

generating the first item description electronic document according to a markup language formatted electronic document template.

7. The method of claim 1, wherein the step of generating the first item description electronic document further comprises:

generating the first item description electronic document to include a reference to the first category list electronic document.

8. The method of claim 1, wherein the step of generating the first category list electronic document comprises:

generating the first category list electronic document corresponding to the first item category according to a category list electronic document template.

9. The method of claim 1, further comprising:

transferring a copy of the first item description electronic document to a second digital storage area on the second computer; and transferring a copy of the first category list electronic document to the second digital storage area on the second computer.

10. The method of claim 1, wherein the step of generating the first item description electronic document comprises:

generating the first item description electronic document to include a reference to at least one of an image file and a sound file, the method further comprising:

storing the at least one of the image file and the sound file in the first digital storage area;

transferring a copy of the first item description electronic document to a second digital storage area on the second computer; and transferring a copy of the first category list electronic document and a copy of the at least one of the image file and the sound file to the second digital storage area on the second computer.

11. The method of claim 10, wherein the second computer comprises an Internet Service Provider computer and the first computer comprises one of a local area network server computer and a personal computer.

12. The method of claim 1, wherein the initiating is further configured not to initiate the transfer of any file of which a copy is already stored on the second computer.

13. The method of claim 1, further comprising:

updating a log file to include at least one entry defining a modification to at least one of the first item description electronic document and the first category list electronic document at a time when the modification is made, wherein said determining is based on whether the log file contains the at least one entry defining the modification to at least one of the first item description electronic document and the first category list electronic document.

14. The method of claim 13, further comprising:

generating a first text formatted electronic document including the first item category, the first item identifier, and the first item description;

storing the first text formatted electronic document in a second digital storage area in the first computer; and updating the log file to include a reference to the first text formatted electronic document.

15. The method of claim 13, wherein the step of generating the first category list electronic document comprises one of:

retrieving the first item description electronic document and determining whether the first item description electronic document includes the first item category which corresponds to the first category list electronic document, searching a plurality of electronic documents of the hierarchical organization of electronic documents for electronic documents which include the first item category, and using the log file to determine whether to retrieve the first item description electronic document and to determine whether the first item description electronic document includes the first item category which corresponds to the first category list electronic document, wherein the log file includes a reference to at least one electronic document which has been updated in the first computer.

16. The method of claim 13, further comprising:

generating a first markup language formatted electronic document in accordance with a document template and including the first item category, the first item identifier, and the first item description;

storing the first markup language formatted electronic document in a second digital storage area in the first computer; and updating the log file to include a reference to the first markup language formatted electronic document.

17. The method of claim 1, further comprising:

deleting a second item description electronic document in the plurality of item description electronic documents stored on the first computer, said second item description electronic document including a second item category;

generating a second category list electronic document, in the first computer, corresponding to the second item category prior to receiving a request for the second category list electronic document from a web browser, said second category list electronic document not including a reference to the deleted second item description electronic document;

initiating a transfer of an instruction to delete a copy of the second item description electronic document stored on the second computer; and initiating a transfer of a copy of the second category list electronic document.

18. The method of claim 1, wherein the generating the first item description electronic document includes modifying a previous first item description electronic document to produce the first item description electronic document, and wherein the generating the first category list electronic document includes modifying a previous first category list electronic document to produce the first category list electronic document.

19. The method of claim 1, wherein the initiating includes an update internet event triggered by a user command.

20. The method of claim 1, wherein the initiating includes an update internet event triggered periodically by a timer.

21. A system for production, revision and hierarchical organization of electronic documents on a computer system, comprising:

a computer code device configured to input a first item description and a first item category;

a computer code device configured to generate a first item identifier corresponding to the first item description;

a computer code device configured to generate a first item description electronic document in a plurality of item description documents including the first item description, the first item category and the first item identifier;

a first computer configured to store the first item description electronic document in a first digital storage area in the first computer;

a computer code device configured to collect at least one existing item description from at least one respective existing item description electronic document in the plurality of item description electronic documents, each of said at least one respective existing item description electronic document including said first item category, and a copy of each of said at least one existing item description electronic document being already stored on a second computer;

a computer code device configured to generate a first category list electronic document, in the first computer, corresponding to the first item category prior to receiving a request for the first category list electronic document from a web browser, said first category list electronic document including at least a portion of the first item description and a reference to the first item description electronic document in the plurality of item description electronic documents, and at least a portion of the at least one existing item description and a reference to each of the at least one respective existing item description electronic document in the plurality of item description electronic documents;

a computer code device configured to determine if any of a copy of the first item description electronic document and each of the at least one existing item description document are already stored on the second computer; and a computer code device configured to initiate a transfer of a copy of the first category list electronic document and a copy of at least one document determined by the computer code device configured to determine not to be already stored on the second computer, and not initiating a transfer of the copy of at least one document determined by the computer code device configured to determine to be already stored on the second computer.

22. The system of claim 21, wherein the computer code device configured to input the first item description is further configured to input data into at least one item description content field and the first computer is further configured to store the first item description electronic document in the first digital storage area in the first computer using a first file name corresponding to the first item category and the first item identifier.

23. The system of claim 21, wherein the first item description electronic document comprises one of a text formatted first item description electronic document and a markup language formatted first item description electronic document.

24. The system of claim 21, further comprising:

a computer code device configured to input a second item description and a second item category;

a computer code device configured to generate a second item identifier corresponding to the second item description;

a computer code device configured to generate a second item description electronic document including the second item description, the second item category and the second item identifier; and a computer code device configured to generate a second category list electronic document, in the first computer, corresponding to the second item category to include a reference to the second item description electronic document, prior to receiving a request for the second category list electronic document from a web browser, wherein the first computer is further configured to store the second item description electronic document in the first digital storage area.

25. The system of claim 21, wherein the first computer is further configured to store the first item description electronic document in a database in the first computer.

26. The system of claim 21, wherein the computer code device configured to generate the first item description electronic document is further configured to generate the first item description electronic document according to a markup language formatted electronic document template.

27. The system of claim 21, wherein the computer code device configured to initiate a transfer is further configured not to initiate the transfer of any file of which a copy is already stored on the second computer.

28. The system of claim 21, further comprising:

a computer code device configured to update a log file to include at least one entry defining a modification to at least one of the first item description electronic document and the first category list electronic document at a time when the modification is made, wherein said computer code device configured to determine determines based on whether the log file contains the at least one entry defining the modification to at least one of the first item description electronic document and the first category list electronic document.

29. The system of claim 28, further comprising:

a computer code device configured to generate a first text formatted electronic document including the first item category, the first item identifier, and the first item description; and a computer code device configured to update the log file to include a reference to the first text formatted electronic document, wherein the first computer is further configured to store the first text formatted electronic document in a second digital storage area in the first computer.

30. The system of claim 28, further comprising:

a computer code device configured to generate a first markup language formatted electronic document in accordance with a document template and including the first item category, the first item identifier, and the first item description; and a computer code device configured to update the log file to include a reference to the first markup language formatted electronic document, wherein the first computer is further configured to store the first markup language formatted electronic document in a second digital storage area in the first computer.

31. The system of claim 21, further comprising:

a computer code device configured to delete a second item description electronic document in the plurality of item description electronic documents stored on the first computer, said second item description electronic document including a second item category;

a computer code device configured to generate a second category list electronic document, in the first computer, corresponding to the second item category prior to receiving a request for the second category list electronic document from a web browser, said second category list electronic document not including a reference to the deleted second item description electronic document;

a computer code device configured to initiate a transfer of an instruction to delete a copy of the second item description electronic document stored on the second computer; and a computer code device configured to initiate a transfer of a copy of the second category list electronic document.

32. The system of claim 21, wherein the computer code configured to generate the first item description electronic document includes a computer code configured to modify a previous first item description electronic document to produce the first item description electronic document, and wherein the computer code configured to generate the first category list electronic document includes a computer code configured to modify a previous first category list electronic document to produce the first category list electronic document.

33. The system of claim 21, wherein the computer code configured to initiate includes an update internet event triggered by a user command.

34. The system of claim 21, wherein the computer code configured to initiate includes an update internet event triggered periodically by a timer.

35. A computer program product configured to store program instructions for execution on a computer system enabling the computer system to perform the steps of:

inputting a first item description and a first item category;

generating a first item identifier corresponding to the first item description;

generating a first item description electronic document in a plurality of item description electronic documents including the first item description, the first item category and the first item identifier;

storing the first item description electronic document in a first digital storage area in a first computer;

collecting at least one existing item description from at least one respective existing item description electronic document in the plurality of item description electronic documents, each of said at least one respective existing item description electronic document including said first item category, and a copy of each of said at least one existing item description electronic document being already stored on a second computer;

generating a first category list electronic document, in the first computer, corresponding to the first item category prior to receiving a request for the first category list electronic document from a web browser, said first category list electronic document including at least a portion of the first item description and a reference to the first item description electronic document in the plurality of item description electronic documents, and at least a portion of each of the at least one existing item description and a reference to each of the at least one respective existing item description electronic document in the plurality of item description electronic documents;

determining if any of a copy of the first item description electronic document and each of the at least one existing item description document are already stored on the second computer; and initiating a transfer of a copy of the first category list electronic document and a copy of at least one document determined by the determining not to be already stored on the second computer, and not initiating a transfer of the copy of at least one document determined by the determining to be already stored on the second computer.

36. The computer program product of claim 35, wherein the step of inputting the first item description further comprises inputting data into at least one item description content field and the step of storing the first item description electronic document further comprises storing the first item description electronic document in the first digital storage area in the first computer using a first file name corresponding to the first item category and the first item identifier.

37. The computer program product of claim 35, wherein the first item description electronic document comprises one of a text formatted first item description electronic document and a markup language formatted first item description electronic document.

38. The computer program product of claim 35, which further stores program instructions for performing the steps of:

inputting a second item description and a second item category;

generating a second item identifier corresponding to the second item description;

generating a second item description electronic document including the second item description, the second item category and the second item identifier;

storing the second item description electronic document in the first digital storage area; and generating a second category list electronic document, in the first computer, corresponding to the second item category to include at least a portion of the second item description and a reference to the second item description electronic document, prior to receiving a request for the second category list electronic document from a web browser.

39. The computer program product of claim 35, wherein the step of generating the first item description electronic document comprises:

generating the first item description electronic document according to a markup language formatted electronic document template.

40. The computer program product of claim 35, wherein the initiating is further configured not to initiate the transfer of any file of which a copy is already stored on the second computer.

41. The computer program product of claim 35, further comprising:

updating a log file to include at least one entry defining a modification to at least one of the first item description electronic document and the first category list electronic document at a time when the modification is made, wherein said determining is based on whether the log file contains the at least one entry defining the modification to at least one of the first item description electronic document and the first category list electronic document.

42. The computer program product of claim 41, which further stores program instructions for performing the steps of:

generating a first text formatted electronic document including the first item category, the first item identifier, and the first item description;

storing the first text formatted electronic document in a second digital storage area in the first computer; and updating the log file to include a reference to the first text formatted electronic document.

43. The computer program product of claim 42, wherein the step of storing the first item description electronic document further comprises:

storing the first item description electronic document in a database in the first computer.

44. The computer program product of claim 41, which further stores program instructions for performing the steps of:

generating a first markup language formatted electronic document in accordance with a document template and including the first item category, the first item identifier, and the first item description;

storing the first markup language formatted electronic document in a second digital storage area in the first computer; and updating the log file to include a reference to the first markup language formatted electronic document.

45. The computer program product of claim 35, further comprising:

deleting a second item description electronic document in the plurality of item description electronic documents stored on the first computer, said second item description electronic document including a second item category;

generating a second category list electronic document, in the first computer, corresponding to the second item category prior to receiving a request for the second category list electronic document from a web browser, said second category list electronic document not including a reference to the deleted second item description electronic document;

initiating a transfer of an instruction to delete a copy of the second item description electronic document stored on the second computer; and initiating a transfer of a copy of the second category list electronic document.

46. The computer program product of claim 35, wherein the generating the first item description electronic document includes modifying a previous first item description electronic document to produce the first item description electronic document, and wherein the generating the first category list electronic document includes modifying a previous first category list electronic document to produce the first category list electronic document.

47. The computer program product of claim 35, wherein the initiating includes an update internet event triggered by a user command.

48. The computer program product of claim 35, wherein the initiating includes an update internet event triggered periodically by a timer.

* * * * *